(12) United States Patent
Shimohara et al.

(10) Patent No.: US 8,905,533 B2
(45) Date of Patent: *Dec. 9, 2014

(54) INK COMPOSITION AND IMAGE FORMING METHOD

(75) Inventors: Norihide Shimohara, Ashigarakami-gun (JP); Koji Hironaka, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 409 days.

This patent is subject to a terminal disclaimer.

(21) Appl. No.: 13/362,623

(22) Filed: Jan. 31, 2012

(65) Prior Publication Data

US 2012/0200653 A1   Aug. 9, 2012

(30) Foreign Application Priority Data

Feb. 7, 2011 (JP) ................................. 2011-024480

(51) Int. Cl.
  *B41J 2/01*   (2006.01)
  *C09D 11/101* (2014.01)
  *B41J 2/21*   (2006.01)

(52) U.S. Cl.
  CPC ............. *C09D 11/101* (2013.01); *B41J 2/2107* (2013.01)
  USPC .............................. 347/100; 347/95; 523/160

(58) Field of Classification Search
  CPC ............ B41J 2/01; B41J 2/211; B41J 2/1433; B41J 2/17; B41J 2/17593; B41J 2/2107; B41J 2/1755; B41J 2/2114; B41J 11/0015; B41J 2/2056; B41J 2/21; C09D 11/36; C09D 11/40; C09D 11/30; C09D 11/38; C09D 11/322; C09D 11/328; C09D 11/101
  USPC ........... 347/100, 95, 96, 102, 101, 88, 99, 20; 106/31.6, 31.27, 31.13; 523/160, 161
  See application file for complete search history.

(56) References Cited

U.S. PATENT DOCUMENTS

| | | | | |
|---|---|---|---|---|
| 5,346,975 | A | * | 9/1994 | Aoshima et al. ............... 526/263 |
| 2008/0108747 | A1 | * | 5/2008 | Nakamura et al. ............ 524/606 |
| 2009/0197056 | A1 | * | 8/2009 | Yokoi et al. .................... 347/100 |
| 2009/0286001 | A1 | | 11/2009 | Kanke et al. |
| 2010/0233446 | A1 | * | 9/2010 | Kawashima et al. ......... 347/100 |
| 2011/0205291 | A1 | * | 8/2011 | Yasuda et al. .................... 347/21 |

FOREIGN PATENT DOCUMENTS

| | | |
|---|---|---|
| EP | 0 072 780 A1 | 2/1983 |
| EP | 0 591 786 A2 | 4/1994 |
| JP | 52-000988 A | 1/1977 |
| JP | 2007-119449 A | 5/2007 |

OTHER PUBLICATIONS

Communication, dated Apr. 11, 2012, issued in corresponding European Application No. 12153054.7, 5 pages.

\* cited by examiner

*Primary Examiner* — Manish S Shah
(74) *Attorney, Agent, or Firm* — Sughrue Mion, PLLC

(57) ABSTRACT

The invention provides an ink composition including:
  (a) a polymer including a repeating unit (a1) having a group represented by the following Formula (1) and a repeating unit (a2) having a hydrophilic group;
  (b) a radical polymerizable compound;
  (c) water; and
  (d) a colorant;

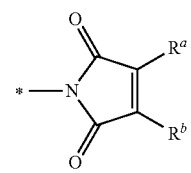

(1)

wherein, in Formula (1), each of $R^a$ and $R^b$ independently represents an alkyl group having from 1 to 4 carbon atoms; $R^a$ and $R^b$ may be bound to each other to form a 4- to 6-membered alicyclic structure; and * represents a bonding site.

14 Claims, No Drawings

INK COMPOSITION AND IMAGE FORMING METHOD

CROSS-REFERENCE TO RELATED APPLICATIONS

This application is based on and claims priority under 35 USC 119 from Japanese Patent Application No. 2011-024480 filed on Feb. 7, 2011, the disclosures of which are incorporated by reference herein.

BACKGROUND

1. Technical Field

The present invention relates to an ink composition and an image forming method.

2. Related Art

Image recording methods for forming an image on recording media, such as paper, based on image data signals include electrophotographic methods, sublimation transfer methods, melt transfer methods, and inkjet methods.

Since the electrophotographic recording method requires a process of forming an electrostatic latent image on a photoreceptor drum by means of electric charge and light exposure, there arise problems in that a relatively more complicate system is necessary, leading to higher production costs. On the other hand, while the apparatus used for a thermal transfer method is inexpensive, there are problems in that use of ink ribbons causes higher running costs and generates waste materials.

In contrast, in an inkjet recording method, an image is formed directly on a recording medium by ejecting ink only to the desired image portion using an inexpensive apparatus. Thus, the inkjet recording method is an excellent image recording method which enables efficient use of ink, of which running cost thereof is inexpensive, and which generates little noise.

Among the ink compositions used for inkjet recording of an image, an active energy ray-curable aqueous ink may be suitably used for printing of an image, a pre-treatment for imparting printability to a recording medium, a post-treatment for protecting and/or modifying a printed image, or the like. Furthermore, since the active energy ray-curable aqueous ink contains water as the main component, it is highly safe and applicable to a high-density inkjet recording owing to a lower viscosity thereof. Thus, the active energy ray-curable aqueous ink serves as a technique having many excellent characteristics and potential.

Examples of basic constitutional materials of an active energy ray-curable aqueous ink include water, a polymerizable substance, a polymerization initiator that generates a radical in response to a radiation and initiates polymerization, and a colorant (such as a pigment or a dye). Japanese Patent Application Laid-Open (JP-A) No. 2007-119449 discloses examples of aqueous polymerizable substances and aqueous polymerization initiators, and discloses an inkjet recording ink composition with which a film having excellent adhesiveness is obtained by light exposure.

SUMMARY

According to an aspect of the present invention, there is provided an aqueous ink composition comprising:

(a) a polymer comprising a repeating unit (a1) having a group represented by the following Formula (1) and a repeating unit (a2) having a hydrophilic group;

(b) a radical polymerizable compound;

(c) water; and (d) a colorant;

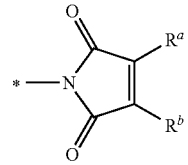

wherein, in Formula (1), each of $R^a$ and $R^b$ independently represents an alkyl group having from 1 to 4 carbon atoms; $R^a$ and $R^b$ may be bound to each other to form a 4- to 6-membered alicyclic structure; and * represents a bonding site.

DETAILED DESCRIPTION

Ink Composition

An ink composition according to the present invention comprises a polymer (component (a), hereinafter which may be simply referred to polymer (a)) that includes a repeating unit (a1) having a group represented by following formula (1) and a repeating unit (a2) having a hydrophilic group, a radical polymerizable compound (component (b)), water (component (c)) and a colorant (component (d)).

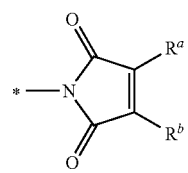

In Formula (1), each of $R^a$ and $R^b$ independently represents an alkyl group having from 1 to 4 carbon atoms; $R^a$ and $R^b$ may be bound to each other to form a 4- to 6-membered alicyclic structure; and * represents a bonding site.

In the present specification, "A to B" refers to a range including A and B as the lower limit and the upper limit thereof.

Hereinafter, an ink composition according to the present invention will be explained in detail.

<Component (a)>

Polymer that includes a repeating unit (a1) having a group represented by Formula (1) and a repeating unit (a2) having a hydrophilic group The polymer (a) used in the present invention may not be limited as long as it is a polymer that includes a repeating unit (a1) having a group represented by Formula (1) and a repeating unit (a2) having a hydrophilic group. Since a compound having a group represented by Formula (1) is used, it is possible to increase the cross-linking reaction of an ink composition.

The content of the repeating unit (a1) in the polymer (a) is preferably from 5% by mass to 90% by mass, more preferably from 10% by mass to 90% by mass, and further more preferably from 30% by mass to 90% by mass. The content of the repeating unit (a2) in the polymer (a) is preferably from 10% by mass to 95% by mass, more preferably from 10% by mass to 90% by mass, and further more preferably from 10% by mass to 70% by mass.

Hereinafter, a repeating unit (a1) having a group represented by Formula (1) and a repeating unit (a2) having a hydrophilic group will be explained in detail.

(Repeating Unit (a1) Having a Group Represented by Formula (1))

A polymer (a) according to the invention includes a repeating unit having a group represented by following Formula (1) as an essential component.

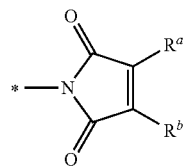

(1)

In Formula (1), each of $R^a$ and $R^b$ independently represents an alkyl group having from 1 to 4 carbon atoms; $R^a$ and $R^b$ may be bound to each other to form a 4- to 6-membered alicyclic structure; and * represents a bonding site.

In Formula (1), $R^a$ and $R^b$ may have a substituent or may not have a substituent, but $R^a$ and $R^b$ not having a substituent are preferred.

Each of $R^a$ and $R^b$ independently represents an alkyl group having 1 to 4 carbon atoms, preferably an alkyl group having 1 to 2 carbon atoms (i.e., a methyl group or an ethyl group) and particularly preferably an alkyl group having one carbon atom (i.e., a methyl group) that may have a linear structure or a branched structure. Specific examples thereof include a methyl group, an ethyl group, a propyl group, an iso-propyl group, a butyl group, an iso-butyl group, a sec-butyl group and a t-butyl group. $R^a$ and $R^b$ may be bonded to each other to form a four- to six-membered ring.

The polymer (a) according to the invention is preferably water-soluble or water-dispersible, and more preferably water-soluble. It is preferable that 1 g of the polymer (a) is capable of dissolving in water at 25° C. in an amount of 30 ml or less, more preferably in an amount of 20 ml or less, and particularly preferably in an amount of 10 ml or less.

Specific examples of the group represented by Formula (1) in the polymer (a) according to the invention are shown as follows. However, the invention is not limited thereto.

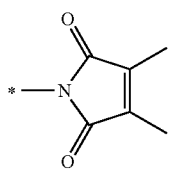

(A-1)

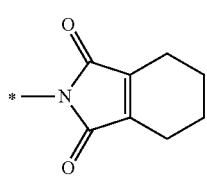

(A-2)

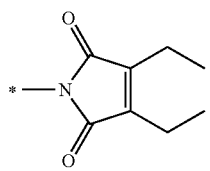

(A-3)

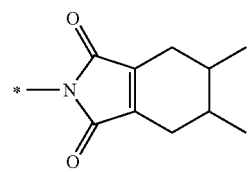

(A-4)

The repeating unit (a1) having a group represented by Formula (1) is preferably a structure represented by following Formula (15.

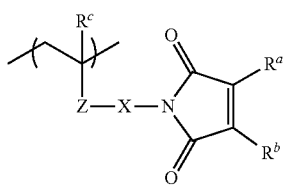

(1')

In Formula (1'), each of $R^a$ and $R^b$ independently represents an alkyl group having from 1 to 4 carbon atoms; $R^a$ and $R^b$ may be bound to each other to foam a 4- to 6-membered alicyclic structure; $R^c$ represents a hydrogen atom or a methyl group; Z represents a single bond, —COO—*, or —CONR$^d$—*; $R^d$ represents a hydrogen atom or an alkyl group having from 1 to 4 carbon atoms; * represents a site bonding to X; and X represents a divalent organic group.

In Formula (1'), each of $R^a$ and $R^b$ independently represents an alkyl group having from 1 to 4 carbon atoms, and $R^a$ and $R^h$ may be bonded to each other to form a four- to six-membered ring. Examples of $R^a$ and $R^b$ (and also preferred examples) in Formula (1') may be the same as the examples of $R^a$ and $R^h$ in Formula (1).

In Formula (1'), $R^c$ represents a hydrogen atom or a methyl group. $R^c$ is preferably a methyl group.

In Formula (1'), Z represents a single bond, —COO—* or —CONR$^d$—*, and $R^d$ represents a hydrogen atom or an alkyl group having 1 to 4 carbon atoms. * represents a site bonding to X. Z is preferably —COO—*.

$R^d$ represents a hydrogen atom or an alkyl group having 1 to 4 carbon atoms that may have a linear structure or a branched structure. Specific examples thereof include a methyl group, an ethyl group, a propyl group, an iso-propyl group, a butyl group, an iso-butyl group, a sec-butyl group and a t-butyl group. $R^d$ is preferably a hydrogen atom or an alkyl group having 1 or 2 carbon atoms, that is, a methyl group or an ethyl group, and it is particularly preferable that $R^d$ is a hydrogen atom. $R^d$ may have a substituent or may not have a substituent, but $R^d$ not having a substituent is preferred.

In Formula (1'), X represents a divalent organic group. The divalent organic group is preferably an alkylene group and which may have a linear structure, a branched structure, or a cyclic structure. The alkylene group optionally contains at least one selected from the group consisting of an ether bond, an ester bond, an amide bond, a urethane bond, and an arylene group. When X represents an alkylene group, the alkylene group preferably has 2 to 20 carbon atoms, more preferably has 2 to 12 carbon atoms, and further more preferably has 2 to 8 carbon atoms.

In Formula (1'), it is preferably that $R^a$ and $R^b$ each independently represent an alkyl group having 1 or 2 carbon atoms, $R^c$ represents a methyl group, Z represents —COO—, and X represents an alkylene group having 2 to 12 carbon atoms.

The content of the repeating unit having a group represented by Formula (1') in the polymer (a) is preferably from 5% by mass to 90% by mass, more preferably from 10% by mass to 90% by mass, and further more preferably from 30% by mass to 90% by mass.

When the polymer (a) contains a structure represented by Formula (1') mentioned above, the polymer (a) is preferably a polymer compound obtained by polymerizing a monomer represented by Formula (1'-1) shown below.

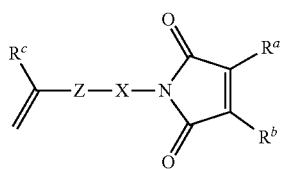

(1'-1)

$R^a$, $R^b$, Z, and X in Formula (1'-1) have the same definitions as those of Formula (1') mentioned above, respectively, and examples (including preferable examples) thereof are also the same.

Examples of preferable monomer represented by (1'-1) include following compounds (1-1-1) to (1-1-11), but the invention is not limited thereto.

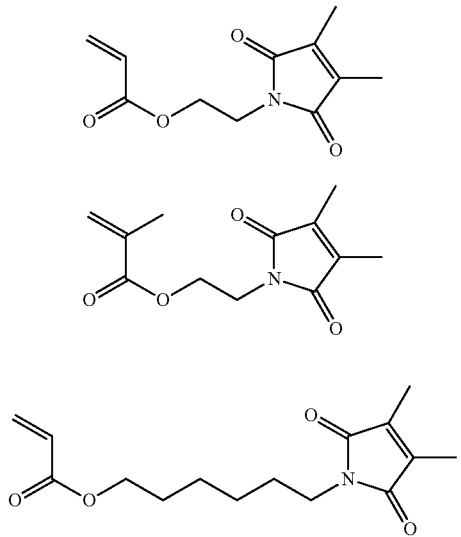

(1-1-1)

(1-1-2)

(1-1-3)

(1-1-4)

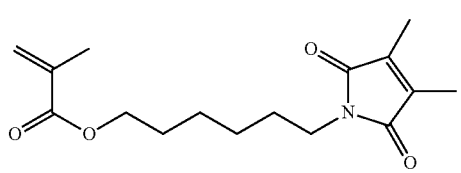

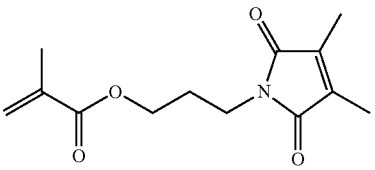

(1-1-5)

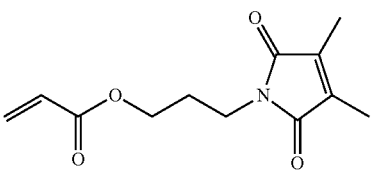

(1-1-6)

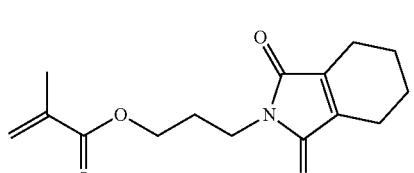

(1-1-7)

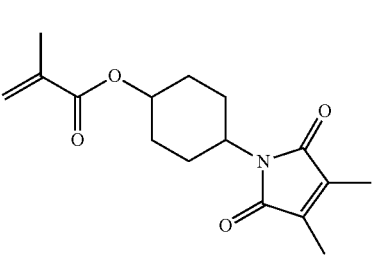

(1-1-8)

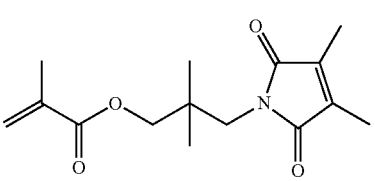

(1-1-9)

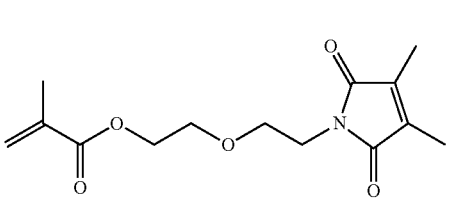

(1-1-10)

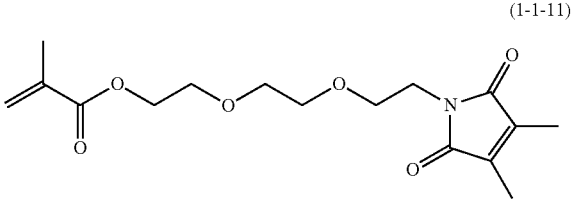

(1-1-11)

Monomers usable as precursors of a repeating unit represented by Formula (1'-1), such as Exemplary Compounds (1-1-1) to (1-1-11) may be produced in accordance with the methods disclosed in Japanese Patent Application Laid-Open (JP-A) Nos. 52-988 and 4-251258, and the like.

(Repeating Unit (a2) Having Hydrophilic Group)

Polymer (a) according to the invention includes a repeating unit (a2) having a hydrophilic group.

The hydrophilic group in the repeating unit (a2) is not limited, and may be any of a nonionic hydrophilic group or an ionic hydrophilic group such as an anionic hydrophilic group or a cationic hydrophilic group as long as the group serves to enhance the hydrophilicity of the polymer (a).

The number of hydrophilic groups in the repeating unit (a2) is not limited, and may be one, or two or more. The number of hydrophilic groups in the repeating unit (a2) is appropriately selected in accordance with, for example, the type of hydrophilic group, or the molecular weight of the polymer (a).

The nonionic hydrophilic group that may be used in the invention is not limited, and is preferably, for example, at least one type of group selected from the group consisting of a residue obtained by removing one hydrogen atom from a heterocyclic compound which contains a nitrogen atom or an oxygen atom, an amido group, a carbamoyl group, an alkyl-substituted carbamoyl group, an alcoholic hydroxyl group, and a group having a polyalkyleneoxy structure, is more preferably at least one type of group selected from the group consisting of a carbamoyl group, an alkyl-substituted carbamoyl group, an alcoholic hydroxyl group, and a group having a polyalkyleneoxy structure, and is particularly preferably at least one type of group selected from the group consisting of an alcoholic hydroxyl group and a group having a polyalkyleneoxy structure.

Examples of the heterocyclic compound which contains a nitrogen atom or an oxygen atom include lactones such as γ-butyrolactone; cyclic ureas such as 2-pyrrolidone or ethylene urea; cyclic carbonates such as ethylene carbonate or propylene carbonate; cyclic ethers such as tetrahydrofurane or 1,4-dioxane; and crown ethers such as 12-crown-4.

The amido group is not limited, and preferable examples thereof include a group represented by the following Formula (11):

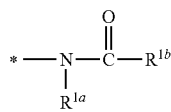
(11)

In Formula (11), $R^{1a}$ and $R^{1b}$ each independently represent a hydrogen atom or an alkyl group; $R^{1a}$ and $R^{1b}$ may be bonded to each other to Run a 4- to 6-membered ring; and * represents a bonding site.

$R^{1a}$ and $R^{1b}$ in Formula (11) each independently represent a hydrogen atom or an alkyl group. The alkyl group represented by $R^{1a}$ or $R^{1b}$ is a straight-chain or branched alkyl group and optionally contains a —COO— bond, an —O— bond, or an —NH— bond. The alkyl group has preferably from 1 to 10 carbon atoms, more preferably from 1 to 6 carbon atoms, and particularly preferably from 1 to 3 carbon atoms. $R^{1a}$ and $R^{1b}$ may be bonded to each other to form a 4- to 6-membered ring. These groups may or may not have a substituent. It is preferable that these groups do not have a substituent. Examples of the alkyl group represented by $R^{1a}$ and $R^{1b}$ include a methyl group and a t-butyl group.

A substituent that $R^{1a}$ or $R^{1b}$ in Formula (11) may have is preferably, for example, a hydroxyl group.

Examples of the alkyl-substituted carbamoyl group include a monoalkyl carbamoyl group in which a hydrogen atom bonded to the N atom of a carbamoyl group is substituted with an alkyl group; and a dialkyl carbamoyl group obtained by replacing two hydrogen atoms bonded to the N atom of a carbamoyl group with alkyl groups. Specifically, preferable examples thereof include a group represented by the following Formula (12):

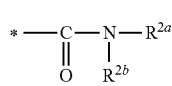
(12)

In Formula (12), $R^{2a}$ and $R^{2b}$ each independently represent a hydrogen atom or an alkyl group; $R^{2a}$ and $R^{2b}$ may be bonded to each other to form a 4- to 6-membered ring; and the symbol * represents a bonding site.

$R^{2a}$ and $R^{2b}$ in Formula (12) each independently represent a hydrogen atom or an alkyl group. The alkyl group represented by $R^{2a}$ or $R^{2b}$ is a straight-chain or branched alkyl group, and optionally contains an —O— bond, a —COO— bond, or a —C(=O)— bond. The alkyl group has preferably from 1 to 10 carbon atoms, more preferably from 1 to 6 carbon atoms, and particularly preferably from 1 to 3 carbon atoms. $R^{2a}$ and $R^{2b}$ may be bonded to each other to form a 4- to 6-membered ring. Specific examples of the alkyl group represented by $R^{2a}$ or $R^{2b}$ are not limited, and include a methylene group and an ethylene group. These groups may or may not have a substituent. It is preferable that these groups do not have a substituent.

A substituent that $R^{2a}$ or $R^{2b}$ in Formula (12) may have is preferably, for example, an alkoxy group having from 1 to 2 carbon atoms or a hydroxyl group.

The group having a polyalkyleneoxy structure is not limited, and preferable examples thereof include a group represented by the following Formula (13):

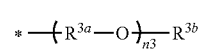
(13)

In Formula (13), $R^{3a}$ represents an alkylene group; $R^{3b}$ represents a hydrogen atom or an alkyl group; n3 represents an integer of from 4 to 50; a plurality of $R^{3a}$ present in Formula (13) may be the same as or different from each other; and * represents a bonding site.

$R^{3a}$ in Formula (13) represents an alkylene group. The alkylene group represented by $R^{3a}$ is a straight-chain, branched, or cyclic alkylene group, and optionally contains an —O-bond or a —COO— bond. The alkylene group has preferably from 1 to 10 carbon atoms, more preferably from 1 to 6 carbon atoms, and particularly preferably from 1 to 3 carbon atoms. A plurality of $R^{3a}$ present in the group represented by Formula (13) may be the same as or different from each other, and is preferably the same. These groups may or may not have a substituent. It is preferable that these groups do not have a substituent. Specific examples of the alkylene group represented by $R^{3a}$ include an ethylene group.

A substituent that $R^{3a}$ in Formula (13) may have is preferably, for example, an alkoxy group having from 1 to 2 carbon atoms or a hydroxyl group.

$R^{3b}$ in Formula (13) represents a hydrogen atom or an alkyl group. The alkyl group represented by $R^{3b}$ is a straight-chain, branched, or cyclic alkyl group, and has preferably from 1 to 10 carbon atoms, more preferably from 1 to 6 carbon atoms, and particularly preferably from 1 to 3 carbon atoms. Specific examples of the alkyl group represented by $R^{3b}$ include a methyl group and an ethyl group.

n3 in Formula (13) represents an integer of from 4 to 50, preferably from 4 to 40, and more preferably from 5 to 30.

The ionic hydrophilic group that may be used in the invention is preferably at least one type of group selected from the group consisting of a carboxyl group, a sulfo group, a phosphoric acid group, a phosphonic acid group, a phenolic hydroxyl group, and salts thereof, and a quaternary ammonium salt. Examples of the salts include a metal salt and an onium salt.

The ionic hydrophilic group is more preferably a group selected from the group consisting of a carboxyl group, a sulfo group, a phosphoric acid group, a phosphonic acid group, and salts thereof, further preferably a group selected from the group consisting of a carboxyl group, a sulfo group, and salts thereof, and particularly preferably selected from the group consisting of a carboxyl group and salts thereof.

A metal salt of a carboxyl group is preferably an alkali metal salt of a carboxyl group. Specific examples thereof include —COOLi, —COONa, and —COOK. The metal salt of a carboxyl group is preferably, for example, —COONa or —COOK.

An onium salt of a carboxyl group may be, for example, an ammonium salt of a carboxyl group, a pyridinium salt of a carboxyl group, or a phosphonium salt of a carboxyl group, and is preferably an ammonium salt of a carboxyl group. Specific examples thereof include a tetraalkyl ammonium salt of a carboxyl group and a trialkyl aryl ammonium salt of a carboxyl group, and a tetraalkyl ammonium salt of a carboxyl group is preferable. Alkyl groups for forming the ammonium salt are preferably alkyl groups having from 1 to 4 carbon atoms. An aryl group for forming the ammonium salt is preferably a phenyl group.

A metal salt of a sulfo group is preferably an alkali metal salt of a sulfo group. Specific examples thereof include —SO$_3$Li, —SO$_3$Na, and —SO$_3$K. The metal salt of a sulfo group is preferably, for example, —SO$_3$Na or —SO$_3$K.

An onium salt of a sulfo group may be, for example, an ammonium salt of sulfo group, a pyridinium salt of sulfo group, or a phosphonium salt of a sulfo group, and is preferably an ammonium salt of a sulfo group. Specific examples thereof include a tetraalkyl ammonium salt of a sulfo group and a trialkyl aryl ammonium salt of a sulfo group, and a tetraalkyl ammonium salt of a sulfo group is preferable. Alkyl groups for forming the ammonium salt are preferably alkyl groups having from 1 to 4 carbon atoms. An aryl group for forming the ammonium salt is preferably a phenyl group.

A metal salt of a phosphoric acid group is preferably an alkali metal salt of a phosphoric acid group. Specific examples thereof include a sodium salt of a phosphoric acid group and a potassium salt of a phosphoric acid group. The metal salt of a phosphoric acid group is preferably, for example a sodium salt of a phosphoric acid.

An onium salt of a phosphoric acid group may be, for example, an ammonium salt of a phosphoric acid group, a pyridinium salt of a phosphoric acid group, or a phosphonium salt of a phosphoric acid group, and is preferably an ammonium salt of a phosphoric acid group. Specific examples thereof include a tetraalkyl ammonium salt of a phosphoric acid group and a trialkyl aryl ammonium salt of a phosphoric acid group, and a tetraalkyl ammonium salt of a phosphoric acid group is preferable. Alkyl groups for forming the ammonium salt are preferably alkyl groups having from 1 to 4 carbon atoms. An aryl group for forming the ammonium salt is a phenyl group.

A metal salt of a phosphonic acid group is preferably an alkali metal salt of a phosphonic acid group. Specific examples thereof include a sodium salt of a phosphonic acid group and a potassium salt of a phosphonic acid group. The metal salt of a phosphonic acid group is preferably, for example, a sodium salt of a phosphonic acid.

An onium salt of a phosphonic acid group may be, for example, an ammonium salt of a phosphonic acid group, a pyridinium salt of a phosphonic acid group, or a phosphonium salt of a phosphonic acid group, and is preferably an ammonium salt of a phosphonic acid group. Specific examples thereof include a tetraalkyl ammonium salt of a phosphonic acid group and a trialkyl aryl ammonium salt of a phosphonic acid group, and a tetraalkyl ammonium salt of a phosphonic acid group is preferable. Alkyl groups for forming the ammonium salt, are preferably alkyl groups having from 1 to 4 carbon atoms. An aryl group for forming the ammonium salt is preferably a phenyl group.

A metal salt of a phenolic hydroxyl group is preferably an alkali metal salt of a phenolic hydroxyl group. Specific examples thereof include a sodium salt of a phenolic hydroxyl group and a potassium salt of a phenolic hydroxyl group. The metal salt of a phenolic hydroxyl group is preferably, for example, a sodium salt of a phenolic hydroxyl group.

An onium salt of a phenolic hydroxyl group may be, for example, an ammonium salt of a phenolic hydroxyl group, a pyridinium salt of a phenolic hydroxyl group, or a phosphonium salt of a phenolic hydroxyl group, and is preferably an ammonium salt of a phenolic hydroxyl group. Specific examples thereof include a tetraalkyl ammonium salt of a phenolic hydroxyl group and a trialkyl aryl ammonium salt of a phenolic hydroxyl group, and a tetraalkyl ammonium salt of a phenolic hydroxyl group is preferable. Alkyl groups for forming the ammonium salt are preferably alkyl groups having from 1 to 4 carbon atoms. An aryl group for forming the ammonium salt is preferably a phenyl group.

The repeating unit (a2) in the polymer (a) preferably has a structure represented by the following Formula (2).

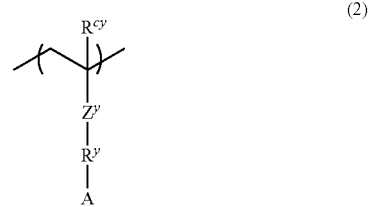

(2)

In Formula (2), $R^{cy}$ represents a hydrogen atom or a methyl group; $Z^y$ represents —COO—*, —CONR$^{dy}$—*, or a single bond; $R^{dy}$ represents a hydrogen atom or an alkyl group having from 1 to 4 carbon atoms; $R^y$ represents a group selected from the group consisting of a single bond, an alkylene group, an arylene group, and an aralkylene group; A represents a hydrophilic group; and * represents a site bonding to $R^y$.

In Formula (2), $R^{cy}$ represents a hydrogen atom or a methyl group.

In Formula (2), $Z^y$ represents —COO—*, —CONR$^{dy}$—*, or a single bond, and preferably —COO—*. * represents a site bonding to $R^y$. $R^{dy}$ represents a hydrogen atom or an alkyl group having 1 to 4 carbon atoms, and the alkyl group having 1 to 4 carbon atoms may have a linear structure or a branched structure. Specific examples thereof include a methyl group, an ethyl group, a propyl group, an isopropyl group, a butyl group, an isobutyl group, a sec-butyl group, and t-butyl group. $R^{dy}$ is preferably a hydrogen atom or an alkyl group having 1 or 2 carbon atoms, that is, a methyl group or an ethyl group, and particularly preferably a hydrogen atom. It should be note that $R^{dy}$ may be substituted or unsubstituted, but is preferably unsubstituted.

Examples of substituents in which $R^{dy}$ may have include an aryl group having 6 to 8 carbon atoms, an alkoxy group having 1 to 8 carbon atoms, a hydroxyl group, a carboxyl group and halogen atoms such as F, Cl, Br and I.

In Formula (2), $R^y$ represents a single bond or a group selected from the group consisting of an alkylene group, an arylene group and an aralkylene group, preferably an alkylene group having 1 to 20 carbon atoms, an arylene group having 6 to 20 carbon atoms and an aralkylene group having 7 to 20 carbon atoms. These groups may have a substituent or may not have a substituent. These groups may each contain an ether bond, an ester bond, an amide bond, or a urethane bond. In Formula (2), $R^y$ is preferably a single bond.

Examples of substituents in which $R^{dy}$ may have include an aryl group having 6 to 8 carbon atoms, an alkoxy group having 1 to 8 carbon atoms, a hydroxyl group, a carboxyl group and halogen atoms such as F, Cl, Br and I.

When $R^y$ is an alkylene group having 1 to 20 carbon atoms, the alkylene group may have a linear structure, a branched structure, or a cyclic structure. When $R^y$ is an alkylene group, the alkylene group preferably has 2 to 12 carbon atoms, and more preferably has 2 to 8 carbon atoms. Specific examples of alkylene group represented by $R^y$ include —$CH_2$—, —$C_2H_4$—, —$C(CH_3)_2$—$CH_2$—, —$CH_2C(CH_3)_2CH_2$—, —$C_6H_{12}$—, $C_4H_7(C_4H_9)C_4H_8$—, $C_{18}H_{36}$, a 1,4-trans-cyclohexylene group, —$C_2H_4$—OCO—$C_2H_4$—, —$C_2H_4$—OCO—, —$C_2H_4$—O—$C_5H_{10}$—, —$CH_2$—O—$C_5H_9$($C_5H_{11}$)—, —$C_2H_4$—CONH—$C_2H_4$—, —$C_4H_8$—OCONH—$C_6H_{12}$—, —$CH_2$—OCONH$C_{10}H_{20}$—, and —$CH_2C(OH)CH_2$—.

When $R^y$ is an arylene group having 6 to 20 carbon atoms, the arylene group preferably has 6 to 18 carbon atoms, more preferably has 6 to 14 carbon atoms, and most preferably has 6 to 10 carbon atoms. Specific examples of arylene group represented by $R^y$ include a phenylene group, a biphenylene group, —$C_6H_4$—CO—$C_6H_4$—, and a naphthylene group.

When $R^y$ is an aralkylene group having 7 to 20 carbon atoms, the aralkylene group preferably has 7 to 18 carbon atoms, more preferably has 7 to 14 carbon atoms, and most preferably has 7 to 10 carbon atoms. Specific examples of aralkylene group represented by $R^y$ include —$C_3H_6$—$C_6H_4$—, —$C_2H_4$—$C_6H_4$—$C_6H_4$—, —$CH_2$—$C_6H_4$—$C_6H_4$—$C_2H_4$—, and —$C_2H_4$—OCO—$C_6H_4$.

The specifics, including examples and preferable ranges, of the hydrophilic group represented by A are the same as those of the hydrophilic group described above.

In Formula (2), in a preferable embodiment, $R^{cy}$ represents a hydrogen atom, $Z^y$ represents —COO—, $R^y$ represents a single bond, an alkylene group having from 2 to 8 carbon atoms, or an arylene group having from 6 to 10 carbon atoms; and A represents a carboxyl group or a sulfo group.

The content of the repeating unit represented by Formula (2) in the polymer (a) is preferably from 10% by mass to 95% by mass, more preferably from 10 to 90% by mass, and particularly preferably from 10% by mass to 70% by mass, with respect to the polymer (a).

A structure represented by Formula (2) may be obtained by polymerization of a monomer represented by following Formula (2-1).

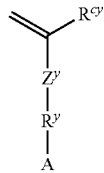

(2-1)

In Formula (2-1), $R^{cy}$, $Z^y$, $R^y$, and A have the same definitions as those in Formula (2), respectively, and preferable ranges thereof are also the same.

Preferable examples of monomer represented by Formula (2-1) include following compounds (2-1-1) to (2-1-27), but the invention is not limited thereto.

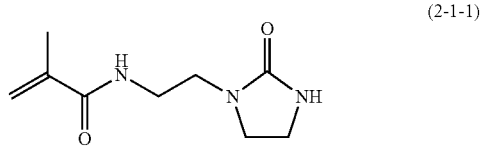

(2-1-1)

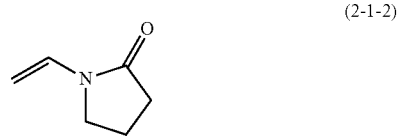

(2-1-2)

(2-1-3)

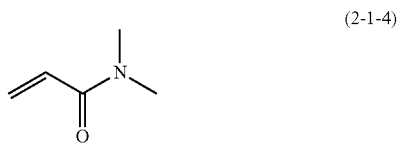

(2-1-4)

(2-1-5)

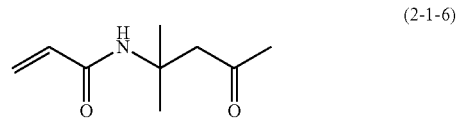

(2-1-6)

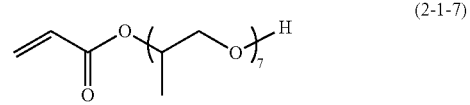

(2-1-7)

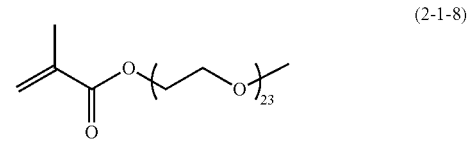

(2-1-8)

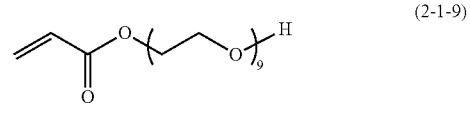

(2-1-9)

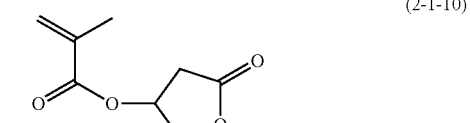

(2-1-10)

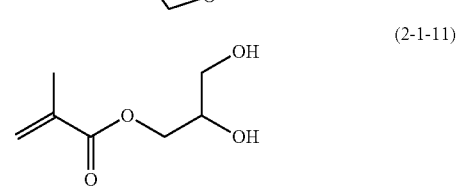

(2-1-11)

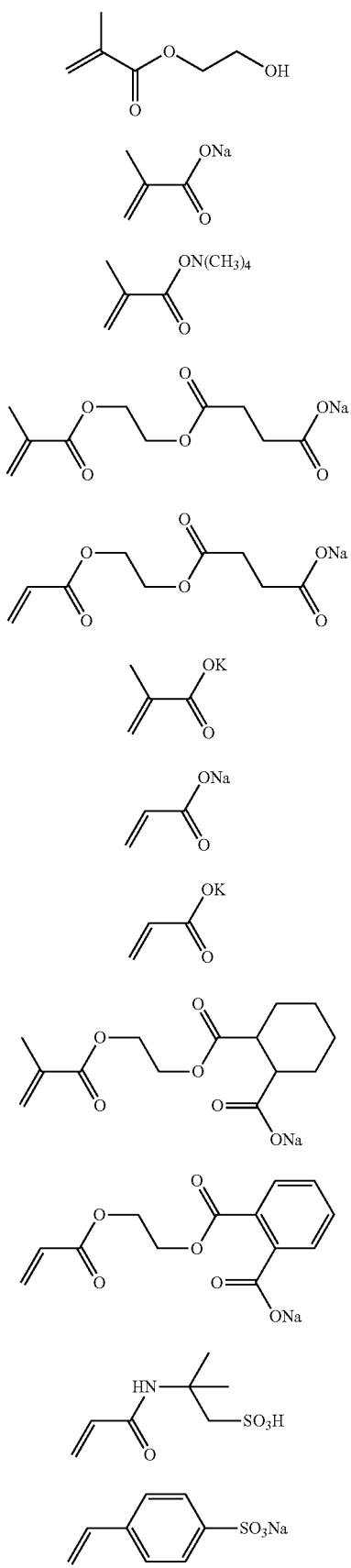
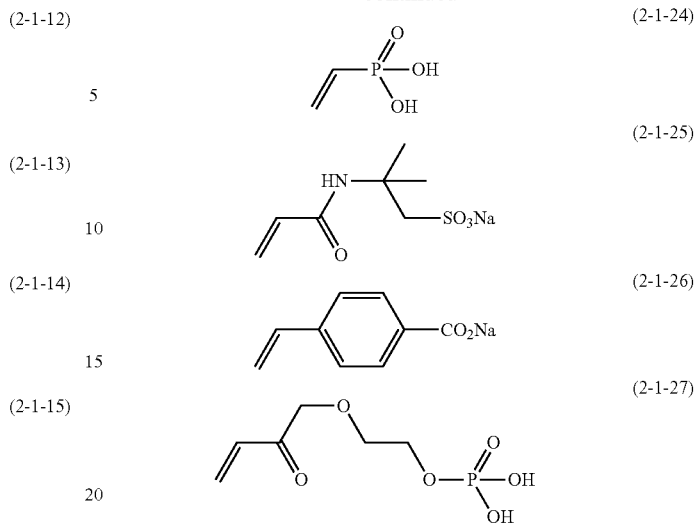

Exemplary compounds (2-2-1) to (2-1-27) which provide a repeating unit represented by the above Formula (2-1) according to the invention may be commercially available products or may be manufactured by a generally-known commonly-used method.

When the polymer (a) according to the invention is synthesized using a monomer represented by Formula (2-1), a hydroxyl group of the monomer may be protected by a protective group such as an ester group of a vinyl acetate or the like, the resultant may be used in a polymerization reaction to form a polymer compound, and the protective group may be detached by saponification to form the polymer (a) according to the invention.

Polymer (a) according to the invention may further include another monomer (hereinafter, also refers to as additional monomer) in addition to the above described compounds. Examples of the additional monomers which are copolymerizable with a monomer represented by Formula (1'-1) and a monomer having a structure represented by Formula (2-1) include styrene, p-methoxystyrene, methyl(meth)acrylate, ethyl(meth)acrylate, allyl(meth)acrylate, butyl(meth)acrylate, hexyl(meth)acrylate, 2-ethylhexyl(meth)acrylate, octyl (meth)acrylate, decyl(meth)acrylate, stearyl(meth)acrylate, cyclohexyl(meth)acrylate, bornyl(meth)acrylate, isobornyl (meth)acrylate, benzyl(meth)acrylate, 2-ethylhexyl diglycol (meth)acrylate, butoxyethyl(meth)acrylate, butoxymethyl (meth)acrylate, 3-methoxybutyl(meth)acrylate, 2-(2-methoxyethoxy)ethyl(meth)acrylate, 2-(2-butoxyethoxy) ethyl(meth)acrylate, 2,2,2-tetrafluoroethyl(meth)acrylate, 1H,1H,2H,2H-perfluorodecyl(meth)acrylate, 4-butylphenyl (meth)acrylate, phenyl(meth)acrylate, 2,4,5-tetramethylphenyl(meth)acrylate, 4-chlorophenyl(meth)acrylate, phenoxymethyl(meth)acrylate, phenoxyethyl(meth)acrylate, glycidyl(meth)acrylate, glycidyloxybutyl(meth)acrylate, glycidyloxyethyl(meth)acrylate, glycidyloxypropyl(meth) acrylate, tetrahydrofurfuryl(meth)acrylate, 2-hydroxyethyl (meth)acrylate, 3-hydroxypropyl(meth)acrylate, 2-hydroxypropyl(meth)acrylate, 2-hydroxybutyl(meth)acrylate, 4-hydroxybutyl(meth)acrylate, 3-hydroxypropyl(meth)acrylate, butoxydiethylene glycol(meth)acrylate, trifluoroethyl (meth)acrylate, perfluorooctylethyl(meth)acrylate, 2-hydroxy-3-phenoxypropyl(meth)acrylate, (meth)acrylamide, N-butyl(meth)acrylamide, N-p-hydroxyphenyl(meth)acrylamide, and p-sulfamoylphenyl(meth)acrylamide. Preferable examples of monomers which are copolymerizable with a monomer represented by Formula (1'-1) include alkyl(meth) acrylates having about 1 to 8 carbon atoms, such as methyl (meth)acrylate, ethyl(meth)acrylate, butyl(meth)acrylate, hexyl(meth)acrylate, or 2-ethylhexyl(meth)acrylate. Any of known monomers other than mentioned above may be additionally used, is necessary.

The polymer (a) may have any of a variety of polymeric structures such as polyurethanes, polyesters, polyethyleneimines, as well as vinyl polymers. However, the polymer (a) is preferably a vinyl polymer from the viewpoint of ejectability and production suitability of the ink composition.

The polymer (a) according to the invention includes a repeating unit represented by the above Formula (1') as (a1) and a repeating unit represented by the above Formula (2) as (a2).

When the polymer (a) according to the invention has a repeating unit represented by the above Formula (1') and a repeating unit represented by the above Formula (2), the copolymerization ratio of the repeating unit represented by Formula (1') to the repeating unit represented by Formula (2) (the repeating unit represented by Formula (1'): the repeating unit represented by Formula (2)) is preferably from 5:95 to 90:10 by mass, more preferably from 10:90 to 90:10 by mass, and particularly preferably from 30:70 to 90:10 by mass. The polymer (a) may include repeating units other than the repeating unit represented by Formula (1') and the repeating unit represented by Formula (2).

Examples of the polymer (a) include, but are not limited to, the following Exemplary Compounds. The following Exemplary Compounds (A-1) to (A-4) are preferable.

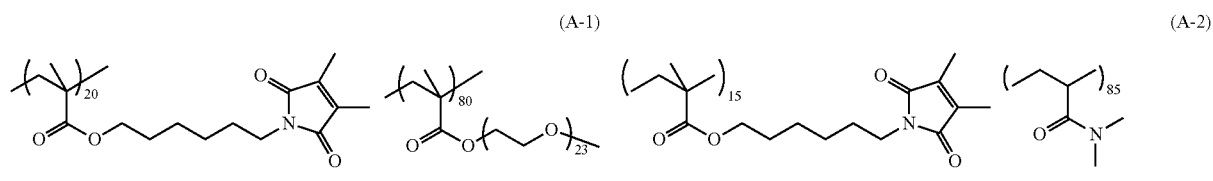

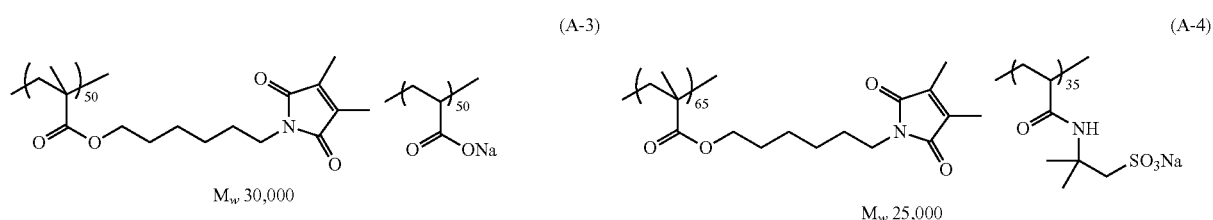

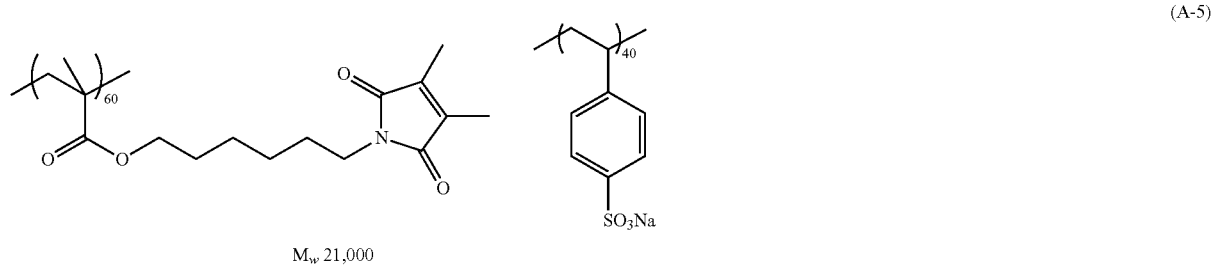

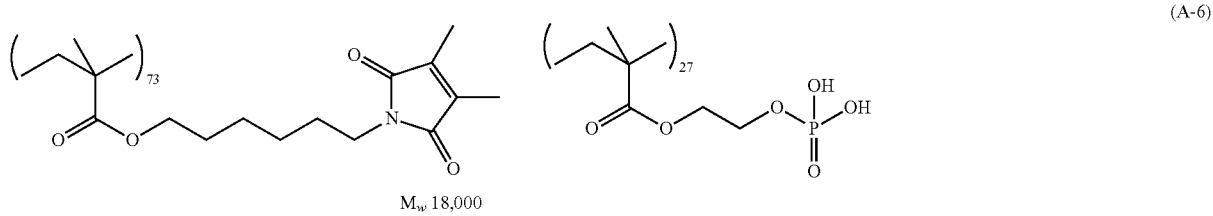

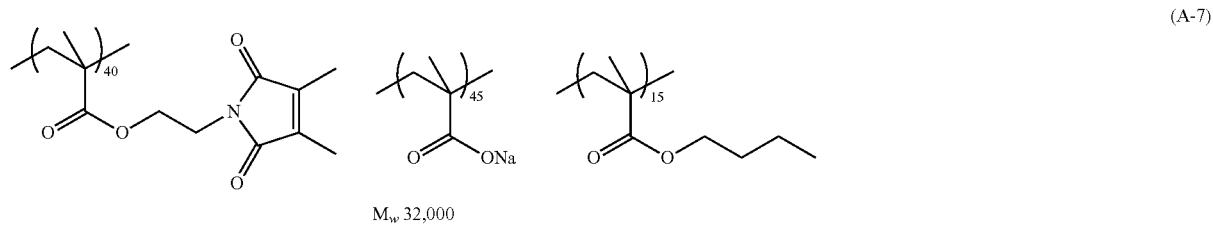

-continued
(A-8)
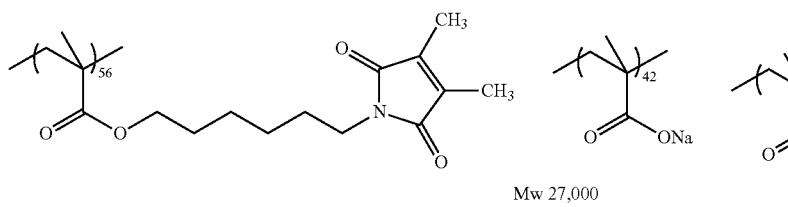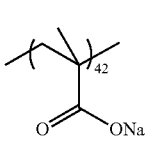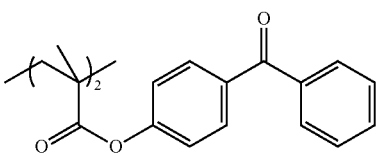
Mw 27,000
(A-9)
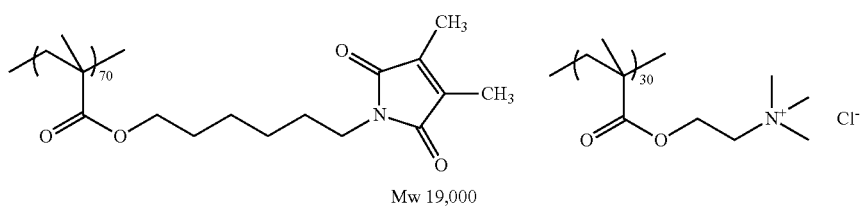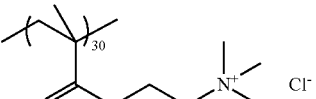
Mw 19,000
(A-10)
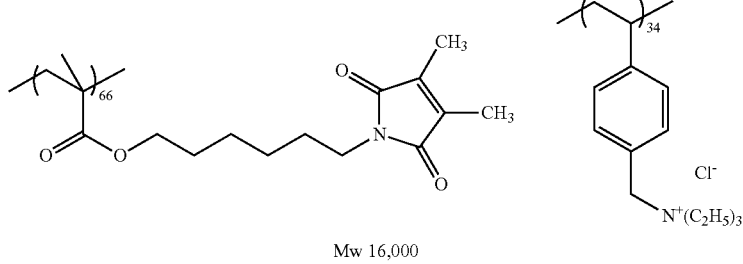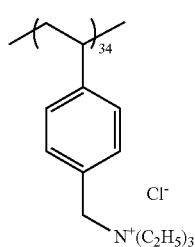
Mw 16,000
(A-11)
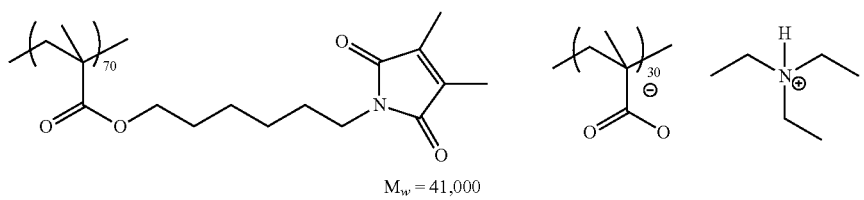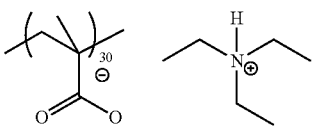
$M_w = 41{,}000$
(A-12)
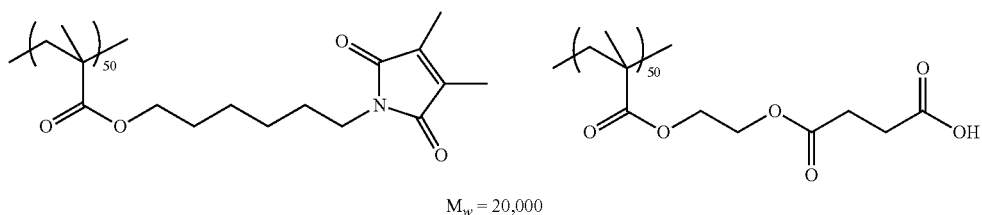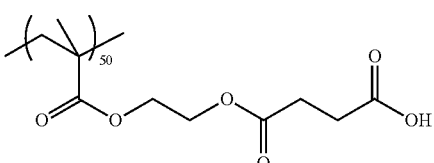
$M_w = 20{,}000$
(A-13)
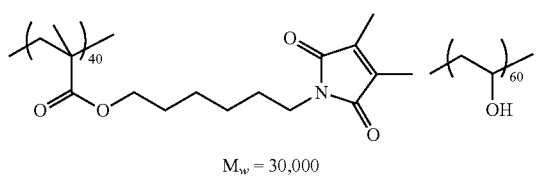
$M_w = 30{,}000$
(A-14)
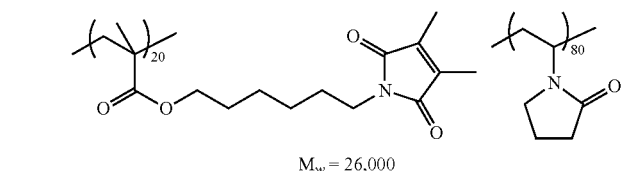
$M_w = 26{,}000$
(A-15)
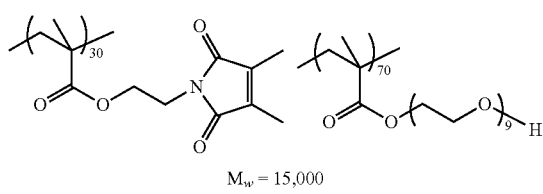
$M_w = 15{,}000$
(A-16)
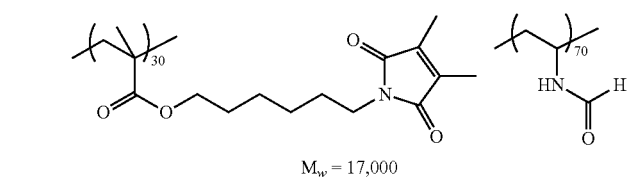
$M_w = 17{,}000$

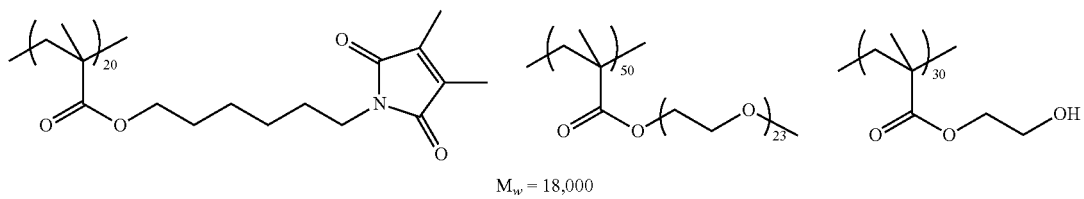

(A-17)

$M_w = 18,000$

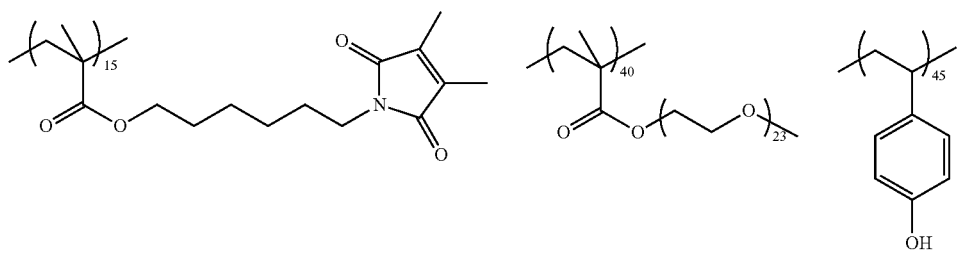

(A-18)

$M_w = 78,000$

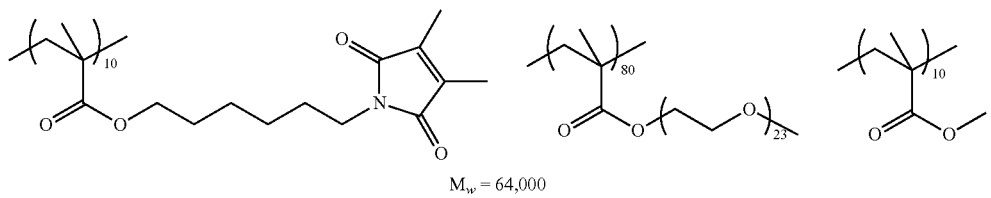

(A-19)

$M_w = 64,000$

The polymer (a) preferably has a weight average molecular weight of from 2,000 to 100,000, more preferably from 2,000 to 80,000, and particularly preferably from 2,000 to 50,000.

The polymer (a) preferably has 8 or more groups represented by Formula (1), more preferably has from 8 to 200 groups represented by Formula (1), still more preferably has from 10 to 150 groups represented by Formula (1), and particularly preferably has from 10 to 120 groups represented by Formula (1), in one molecule of the polymer (a).

The number of groups represented by Formula (1) in the polymer may be determined from the weight average molecular weight of the polymer (a) and the copolymerization ratio. For example, in the case of a binary polymer in which the copolymerization ratio of a repeating unit having a molecular weight $M_A$ to a repeating unit having a molecular weight $M_B$ is $X^A:X^B$, and of which the weight average molecular weight of the polymer is $M_x$, the number of groups contained in the polymer (a) can be calculated as $\{M_x* [X^A/(X^A+X^B)]\}/M_A$ (groups).

Weight average molecular weight is measured with a gel permeation chromatography (GPC). HLC-8020GPC (trade name, manufactured by Tosoh Corporation) is used as GPC, TSKgel Super HZM-H, TSKgel Super HZ4000, TSKgel SuperHZ200 (4.6 mmID×15 cm; trade names, all manufactured by Tosoh Corporation) are used as columns, and THF (tetrahydrofurane) is used as an eluent.

The polymer (a) according to the invention can be obtained by polymerizing ingredients such as a precursor represented by the above Formula (1'-1) or (2-1) by a known polymerization method, and, if necessary, neutralizing acidic groups by, for example, a hydroxide of an alkali metal. For example, the polymer (a) can be manufactured by a method similar to the polymerization methods described in JP-A Nos. 52-988, and 55-154970, and Langmuir vol. 18, No 14, pp 5414-5421 (2002) and the like.

The content of the polymer (a) in the ink composition is preferably from 0.1% by mass to 40% by mass, more preferably from 0.5% by mass to 20% by mass, and furthermore preferably from 1.0% by mass to 15% by mass.

<Component (b) Radical Polymerizable Compound>

The ink composition of the invention includes a radical polymerizable compound as a component (b) (hereinafter, also refers to as radical polymerizable compound (b) or simply refers to as radical polymerizable compound). When the ink composition of the invention includes the polymer (a) together with the radical polymerizable compound (b), an image having an excellent ink curing properties can be formed, and an ink composition exhibiting an excellent ejection recovery property or the like when used as an inkjet ink can be obtained. Although mechanisms for obtaining such effects of the present invention are not clear, the present inventors speculate as follows.

It is speculated that, in the ink composition of the invention, polymerization of at least one of the polymer having a structure of Formula (1) and the radical polymerizable compound (b) proceeds due to the use of the radical polymerizable compound (b), and the progress of the polymerization and the curing of the polymer (a) provide an excellent fixability and the like. Further, in the invention, when the ink includes the radical polymerizable compound (b), an effect in terms of slowing the drying of the ink in the vicinity of an inkjet nozzle when the ink is used for an inkjet is produced, and ejectability after ejection is once paused, which is called "ejection recovery property", is improved.

The radical polymerizable compound (b) that is used in the ink composition of the invention is not limited as long as the radical polymerizable compound is a compound of which polymerization reaction proceeds by a radical.

The radical polymerizable compound may be used singly, or in mixture of two or more thereof. The radical polymerizable compound may be a monofunctional compound or a polyfunctional compound. When the proportion of monofunctional compounds is high, a cured product tends to be soft, and when the proportion of polyfunctional compounds is high, the curability tends to be high. Accordingly, the ratio between the monofunctional compound and the polyfunctional compound is determined appropriately in accordance with the use.

As the radical polymerizable compound, for example, a variety of known radical polymerizable compounds which undergo polymerization reactions in the presence of an initiating species generated from a group represented by Formula (1) and/or a polymerization initiator may be used.

The radical polymerizable compound to be added is not limited to a radical polymerizable monomer, and a radical polymerizable oligomer may also be added. The radical polymerizable oligomer is a compound which has at least one radical polymerizable group at a terminal of an oligomer and which has a weight average molecular weight of from 400 to 10,000.

Preferable examples of the radical polymerizable compound include a compound having a radical-polymerizable ethylenic unsaturated bond. A more specific example thereof is a compound having, in a molecule thereof, at least one radical-polymerizable ethylenic unsaturated bond.

Examples of the radical polymerizable compound include unsaturated carboxylic acids such as acrylic acid, methacrylic acid, itaconic acid, crotonic acid, isocrotonic acid, and maleic acid; unsaturated carboxylic acid esters and salts thereof; anhydrides having an ethylenic unsaturated group; (meth) acrylamide; styrene derivatives; vinyl ethers; and N-vinyl compounds.

Examples of the radical polymerizable compound include, in particular, a radical polymerizable monofunctional monomer and a radical polymerizable polyfunctional monomer.

Examples of the radical polymerizable monofunctional monomer include acrylamide, 2-hydroxyethyl acrylamide, 2-hydroxymethyl acrylamide, t-butyl acrylamide, 3-dimethyl aminopropyl acrylamide, 2-hydroxyethyl vinyl ether, 4-hydroxybutyl vinyl ether, methoxy oligoethylene glycol(meth) acrylate, methoxypolyethylene glycol(meth)acrylate, polyethylene glycol(meth)acrylate, tetrahydrofurfuryl acrylate, 2-hydroxyethyl(meth)acrylate, and 2-hydroxypropyl(meth) acrylate, in addition to the polymerizable compounds (2-1-1) to (2-1-27) shown above.

Examples of the radical polymerizable polyfunctional monomer include oligoethylene glycol di(meth)acrylate, polyethylene glycol di(meth)acrylate, bis[2-(methacryloyloxy)ethyl]phosphate, methylene bisacrylate, 4,7,10-trioxa-1,13-tridecane bisacrylamide and triethylene glycol divinyl ether.

In addition to those listed above, examples of the radical polymerizable polyfunctional monomer also include the following compounds. However, the invention is not limited thereto.

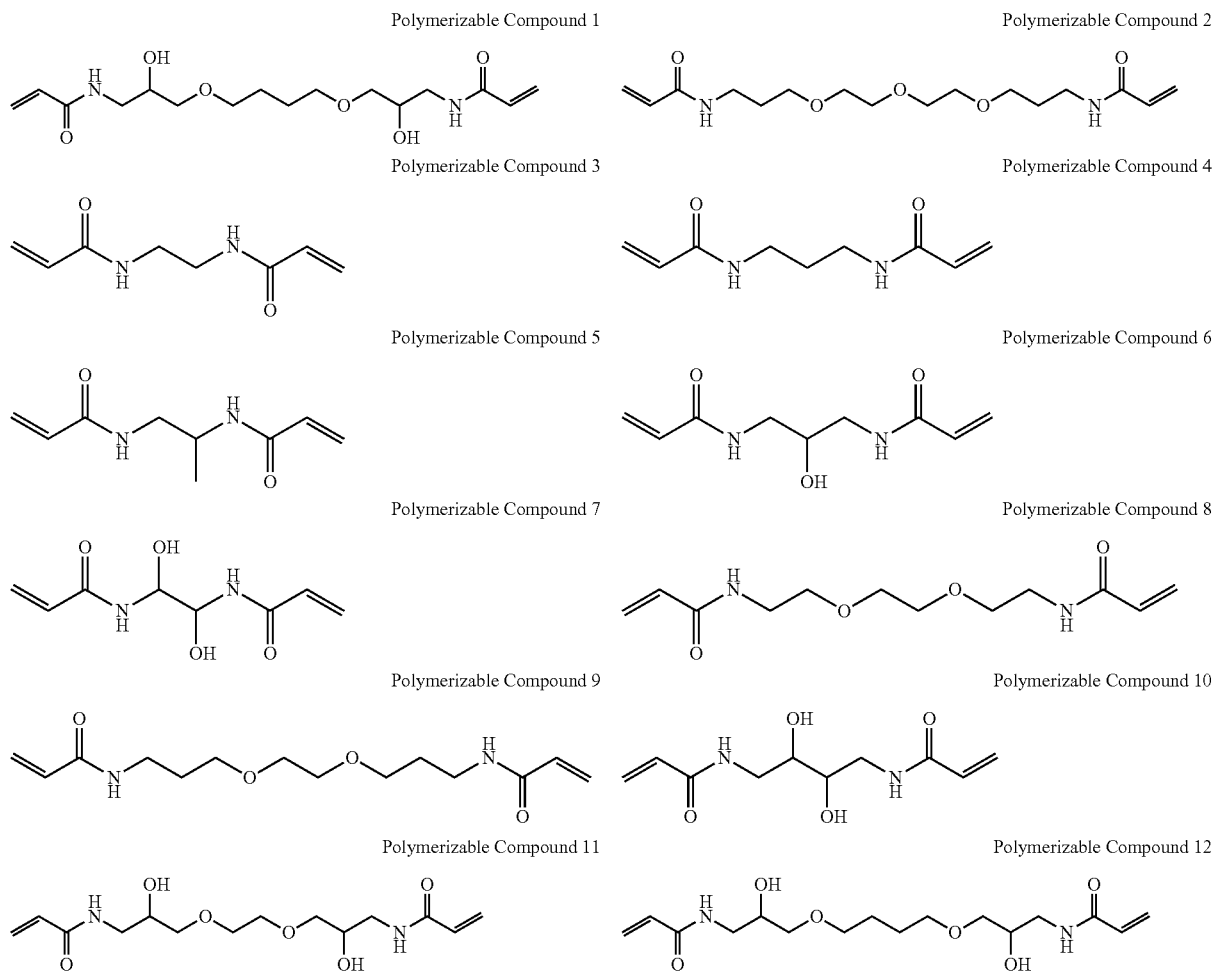

-continued
Polymerizable Compound 13
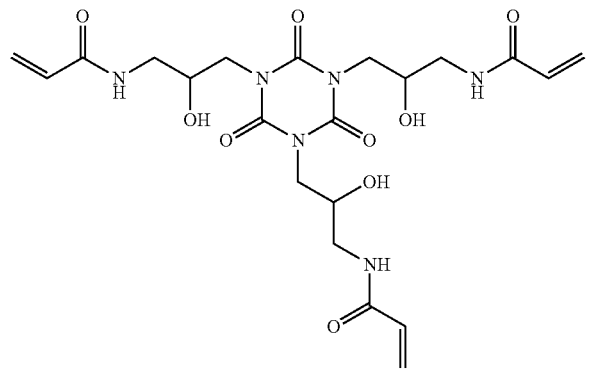
Polymerizable Compound 14
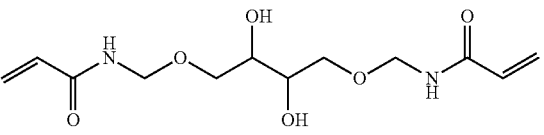
Polymerizable Compound 15
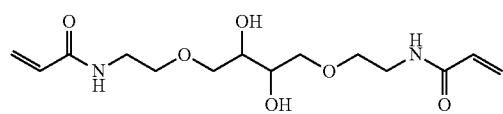
Polymerizable Compound 16
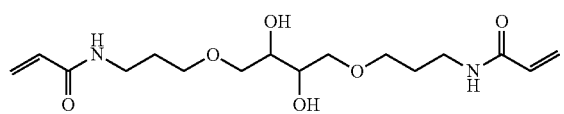
Polymerizable Compound 17
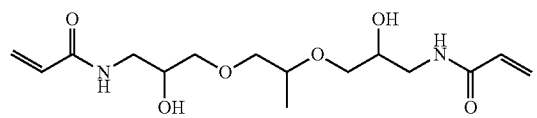
Polymerizable Compound 18
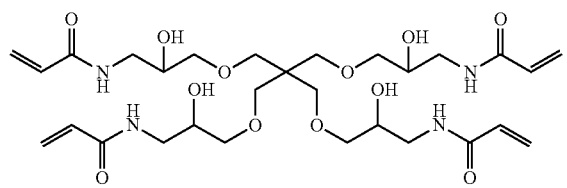
Polymerizable Compound 19
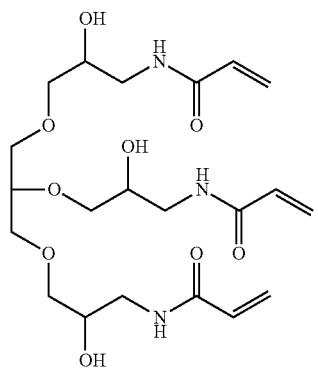
Polymerizable Compound 20
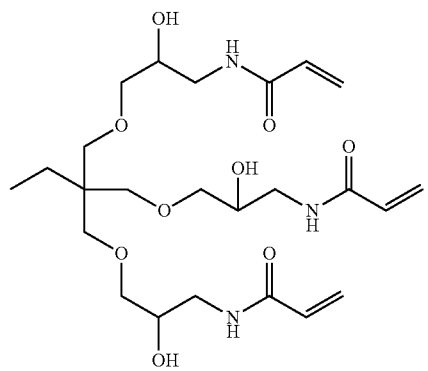
Polymerizable Compound 21
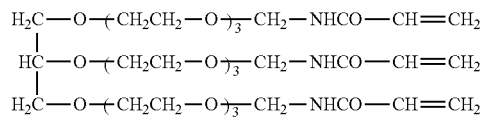
Polymerizable Compound 22
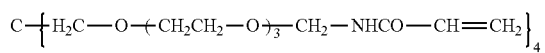
Polymerizable Compound 23
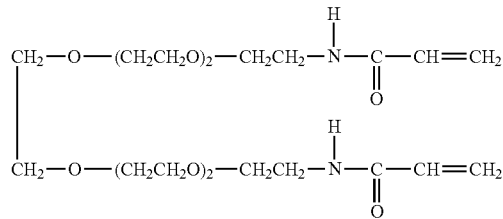
Polymerizable Compound 24
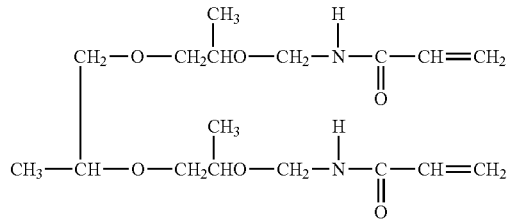

Polymerizable Compound 25
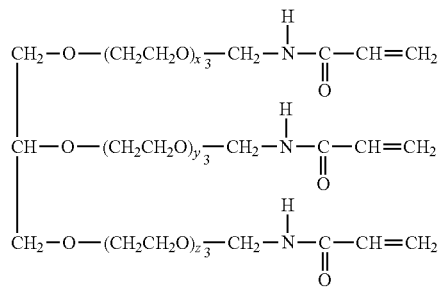
$x_3 + y_3 + z_3 = 6$
Polymerizable Compound 26
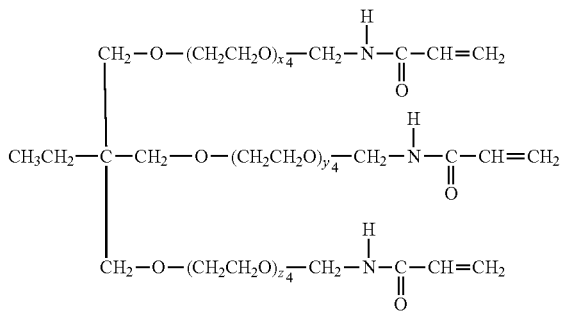
$x_4 + y_4 + z_4 = 9$
Polymerizable Compound 27
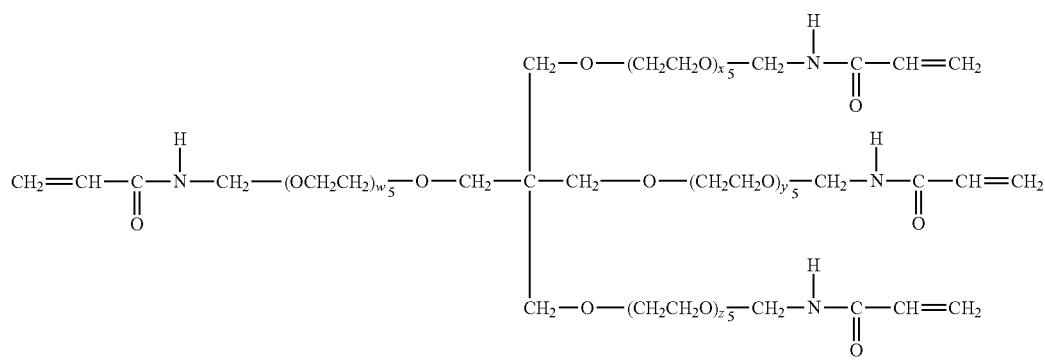
$w_5 + x_5 + y_5 + z_5 = 6$
Polymerizable Compound 28
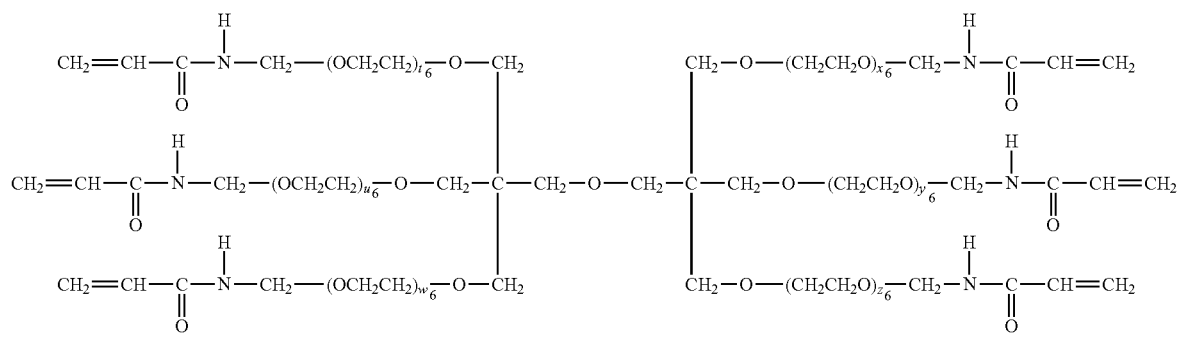
$t_6 + u_6 + w_6 + x_6 + y_6 + z_6 = 12$
Polymerizable Compound 29
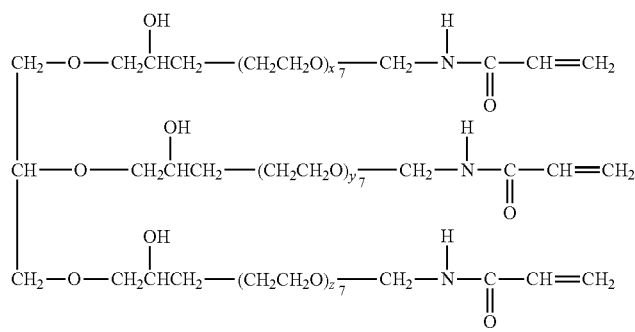
$x_7 + y_7 + z_7 = 3$ -continued
Polymerizable Compound 30
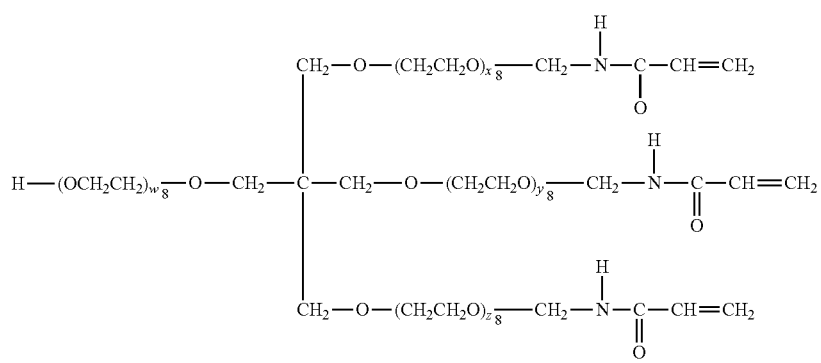
$w_8 + x_8 + y_8 + z_8 = 6$
Polymerizable Compound 31
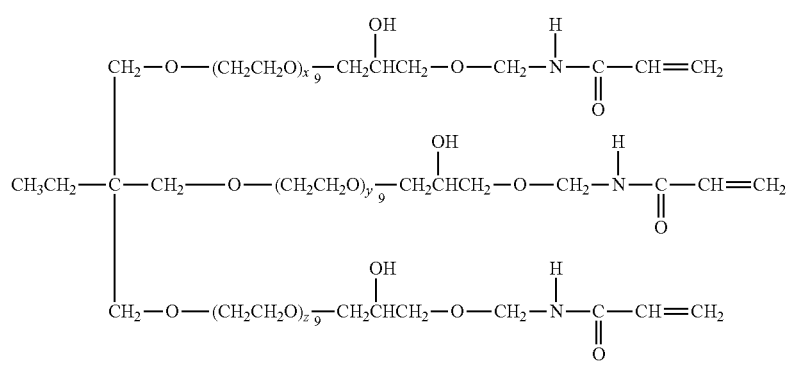
$x_9 + y_9 + z_9 = 3$
Polymerizable Compound 32
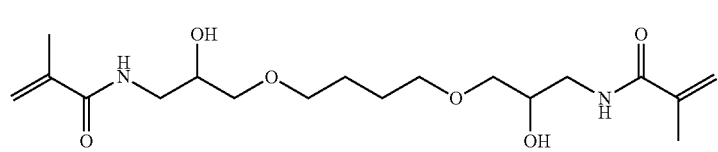
Polymerizable Compound 33
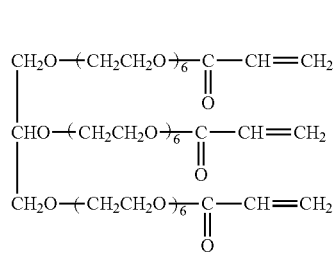
Polymerizable Compound 34
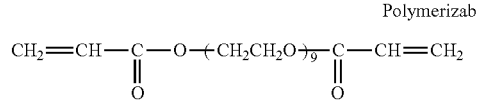
Polymerizable Compound 35
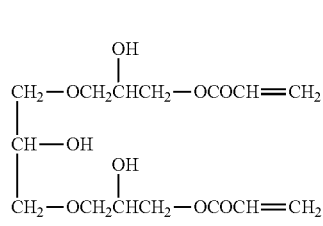
Polymerizable Compound 36
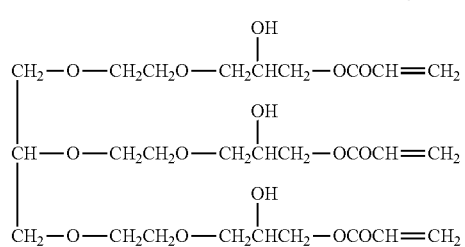

Polymerizable Compound 37

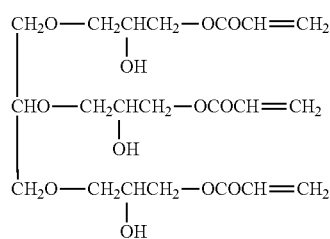

Polymerizable Compound 38

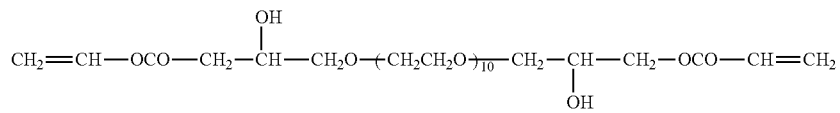

Polymerizable Compound 39

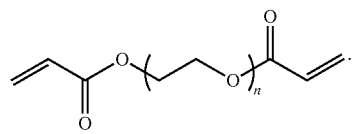

n represents from 8 to 30

It is preferable to use at least one oligomer selected from a polyester oligomer, a urethane oligomer, a modified polyether oligomer, an acrylic oligomer, or an epoxy oligomer as the radical polymerizable oligomer.

The radical polymerizable compound employed in the invention preferably has a (meth)acryloyloxy group or a (meth)acrylamide group, and more preferably has plural of (meth)acryloyloxy groups or plural (meth)acrylamide groups.

Here, the term "(meth)acryloyloxy group" represents at least one of an acryloyloxy group or a methacryloyloxy group, and the term "(meth)acrylamide group" represents at least one of an acrylamide group or a methacrylamide group.

The radical polymerizable compound having a (meth)acryloyloxy group that is preferably used in the invention is further preferably a compound represented by Formula (M-1).

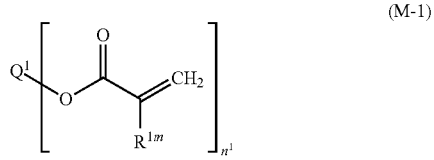

In Formula (M-1), $Q^1$ represents an $n^1$-valent linking group, $R^{1m}$ represents a hydrogen atom or a methyl group, and $n^1$ represents an integer of 1 or greater.

The compound represented by Formula (M-1) has a structure in which an unsaturated monomer is bonded to the linking group $Q^1$ through an ester bond. $R^{1m}$ represents a hydrogen atom or a methyl group, and is preferably a hydrogen atom. $n^1$, which is the valency of the linking group $Q^1$, is preferably 2 or more, more preferably from 2 to 6, and further preferably from 2 to 4.

The linking group $Q^1$ is not particularly limited as long as the linking group $Q^1$ is a group capable of bonding with a (meth)acryloyloxy structure. Specific examples thereof include a residue obtained by removing $n^1$ hydrogen atoms or hydroxyl groups from a compound selected from the following compound group X.

—Compound Group X—

Ethylene glycol, diethylene glycol, triethylene glycol, polyethylene glycol, propylene glycol, dipropylene glycol, tripropylene glycol, polypropylene glycol, 1,3-propanediol, 1,2-butanediol, 1,3-butanediol, 1,4-butanediol, 2,3-butanediol, 1,5-pentanediol, 1,4-pentanediol, 1,3-pentanediol, 2,4-pentanediol, 3-methyl-1,5-pentanediol, 2-methyl-2,4-pentanediol, 1,6-hexanediol, 1,5-hexanediol, 2,5-hexanediol, glycerin, 1,2,4-butanediol, 1,2,5-pentanetriol, 1,2,6-hexanetriol, trimethylolpropane, trimethylolethane, ditrimethylolpropane, ditrimethylolethane, thiodiglycol, neopentyl glycol, pentaerythritol, and dipentaerythritol, and condensates thereof; polyols such as sugars, and polyamines such as ethylenediamine, diethylenetriamine, triethylenetetramine, polyethyleneimine and polypropylenediamine.

Further examples of the linking group $Q^1$ include a substituted or unsubstituted alkylene chain having 4 or less carbon atoms such as a methylene group, an ethylene group, a propylene group, or a butylene group; and a functional group having a saturated or unsaturated heterocycle such as a pyridine ring, an imidazole ring, a pyrazine ring, a piperidine ring, a piperazine ring, or a morpholine ring.

Among the above, the linking group $Q^1$ is preferably a residue of a polyol containing an oxyalkylene group (preferably an oxyethylene group), and more preferably a residue of a polyol containing three or more oxyalkylene groups (preferably an oxyethylene group).

The radical polymerizable compound having a (meth)acrylamide group that is preferably used in the invention is further preferably a compound represented by Formula (M-2).

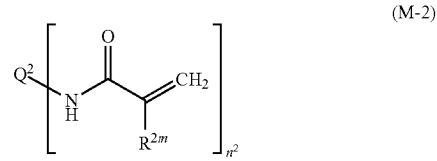

In Formula (M-2), $Q^2$ represents an $n^2$-valent linking group, and $R^{2m}$ represents a hydrogen atom or a methyl group, and $n^2$ represents an integer of 1 or greater.

The compound represented by Formula (M-2) has structure in which an unsaturated monomer is bonded to the linking group $Q^2$ through an amide bond. $R^{2m}$ represents a hydrogen atom or a methyl group, and is preferably a hydrogen atom. $n^2$, which is the valency of the linking group $Q^2$, is preferably 2 or more, more preferably from 2 to 6, and further preferably from 2 to 4.

The linking group $Q^2$ is not particularly limited as long as the linking group $Q^2$ is a group capable of bonding with a (meth)acrylamide structure. Specific examples thereof include a residue obtained by removing $n^2$ hydrogen atoms or hydroxyl groups from a compound selected from the compound group X described above.

Among the above, the linking group $Q^2$ is preferably a residue of a polyol containing an oxyalkylene group (preferably an oxyethylene group), and particularly preferably a residue of a polyol containing 3 or more oxyalkylene groups (preferably an oxyethylene group).

The ratio of the radical polymerizable compound (b) to the ink composition of the invention is preferably from 0.1% by mass to 30% by mass, and more preferably from 1% by mass to 20% by mass, with respect to the total mass of the ink composition, from the viewpoint of curability.

The ratio by mass of the radical polymerizable compound (b) to the polymer (a), (a):(b), in the ink composition is preferably from 20:80 to 80:20, more preferably from 30:70 to 80:20, and particularly preferably from 30:70 to 70:30 by mass. Within the above range, the ink viscosity and ejection recovery property tends to be well-balanced.

<Component (c) Water>

The ink composition of the invention contains water.

Water is preferably ion-exchange water, distilled water, or the like, which does not substantially contain impurities.

The content of water in an ink composition of the invention is preferably from 10% by mass to 97% by mass, more preferably from 30% by mass to 90% by mass, and further more preferably from 40% by mass to 85% by mass.

<Component (d) Colorant>

The ink composition of the invention further contains a colorant as a component (d).

The colorant usable in the invention is not particularly limited, and may be arbitrary selected from known colorants such as pigments, water-soluble dyes, and dispersive dyes. Of theses, the colorant preferably contains a pigment.

(Pigment)

The pigment is not particularly limited, and may be appropriately selected depending on the purpose. Examples of pigment include known organic pigments and inorganic pigments, and also include resin particles colored with a dye, and commercially available pigment dispersions and surface-treated pigments (e.g., pigments dispersed in a dispersion medium such as water, a liquid organic compound, or an insoluble resin, and pigments having surface treated with a resin, a pigment derivative, or the like). Examples of the pigment include those disclosed in Seijiro Ito, "Ganryo no Jiten", 2000, Asakura Publishing Co., Ltd., Isao Hashimoto "Yuki Ganryo Handbook", 2006, Color Office Co., Ltd., W. Herbst, K. Hunger "Industrial Organic Pigments", 1992, Wiley-VHC, JP-A No. 2002-12607, JP-A No. 2002-188025, JP-A No. 2003-26978, JP-A No. 2003-342503, JP-A No. 2009-235370, and the like.

Examples of organic pigments and inorganic pigments include yellow pigments, red pigments, magenta pigments, blue pigments, cyan pigments, green pigment, orange pigments, purple pigments, brown pigments, black pigments, and white pigments.

Examples of yellow pigments include: monoazo pigments such as C.I. Pigment Yellow 1, 2, 3, 4, 5, 10, 65, 73, 74, 75, 97, 98, 111, 116, 130, 167, or 205; monoazo lake pigments such as C.I. Pigment Yellow 61, 62, 100, 168, 169, 183, 191, 206, 209, or 212; disazo pigments such as C.I. Pigment Yellow 12, 13, 14, 16, 17, 55, 63, 77, 81, 83, 106, 124, 126, 127, 152, 155, 170, 172, 174, 176, 214, or 219; anthraquinone pigments such as C.I. Pigment Yellow 24, 99, 108, 193, or 199; monoazopyrazolone pigments such as C.I. Pigment Yellow 60; condensed azo pigments such as C.I. Pigment Yellow 93, 95, 128, or 166; isoindoline pigments such as 109, 110, 139, 173, or 185; benzimidazolone pigments such as C.I. Pigment Yellow 120, 151, 154, 175, 180, 181, or 194; azomethine metal complex pigments such as C.I. Pigment Yellow 117, 129, 150, or 153; quinophthalone pigments such as C.I. Pigment Yellow 138; and quinoxaline pigments such as C.I. Pigment Yellow 213.

Examples of red or magenta pigments include: monoazo lake pigments such as C.I. Pigment Red 193; disazo pigments such as C.I. Pigment Red 38; naphthol AS pigments such as C.I. Pigment Red 2, 5, 8, 9, 10, 11, 12, 14, 15, 16, 17, 18, 22, 23, 31, 32, 112, 114, 146, 147, 150, 170, 184, 187, 188, 210, 213, 238, 245, 253, 256, 258, 266, 268, or 269; β-naphthol pigments such as C.I. Pigment Red 3, 4, or 6; β-naphthol lake pigments such as C.I. Pigment Red 49, 53, or 68; naphthol AS lake pigments such as C.I. Pigment Red 237, 239, or 247; pyrazolone pigments such as C.I. Pigment Red 41; BONA lake pigments such as C.I. Pigment Red 48, 52, 57, 58, 63, 64:1, or 200; xanthene lake pigments such as C.I. Pigment Red 81:1, 169, or 172; thioindigo pigments such as C.I. Pigment Red 88, 181, or 279; perylene pigments such as C.I. Pigment Red 123, 149, 178, 179, 190, or 224; condensed azo pigments such as C.I. Pigment Red 144, 166, 214, 220, 221, 242, or 262; anthraquinone pigments such as C.I. Pigment Red 168, 177, 182, 226, or 263; anthraquinone lake pigments such as C.I. Pigment Red 83; benzimidazolone pigments such as C.I. Pigment Red 171, 175, 176, 185, or 208; quinacridon pigments such as C.I. Pigment Red 122, 202 (including a mixture thereof with C.I. Pigment Violet 19), 207, or 209; diketopyrrolopyrrole pigments such as C.I. Pigment Red 254, 255, 264, 270, or 272; and azomethine metal complex pigments such as C.I. Pigment Red 257 or 271.

Examples of blue or cyan pigments include: naphthol AS pigments such as C.I. Pigment Blue 25 or 26; phthalocyanine pigments such as C.I. Pigment Blue 15, 15:1, 15:2, 15:3, 15:4, 15:6, 16, 17:1, 75, or 79; dyeing lake pigments such as C.I. Pigment Blue 1, 24:1, 56, 61, or 62; anthraquinone pigments such as C.I. Pigment Blue 60; indigo pigments such as C.I. Pigment Blue 63; and dioxadine pigments such as C.I. Pigment Blue 80.

Examples of green pigments include dyeing lake pigments such as C.I. Pigment Green 1 or 4; phthalocyanine pigments such as C.I. Pigment Green 7 or 36; and azomethine metal complex pigments such as C.I. Pigment Green 8.

Examples of orange pigments include monoazo pigments such as C.I. Pigment Orange 1; β-naphthol pigments such as C.I. Pigment Orange 2, 3, or 5; naphthol AS pigments such as C.I. Pigment Orange 4, 24, 38, or 74; pyrazolone pigments such as C.I. Pigment Orange 13 or 34; benzimidazolone pigments such as C.I. Pigment Orange 36, 60, 62, 64, or 72; disazo pigments such as C.I. Pigment Orange 15 or 16; β-naphthol lake pigments such as C.I. Pigment Orange 17 or 46; naphthalene sulfonate lake pigments such as C.I. Pigment Orange 19; perinone pigments such as C.I. Pigment Orange 43; quinacridon pigments such as C.I. Pigment Orange 48 or 49; anthraquinone pigments such as C.I. Pigment Orange 51; isoindolinone pigments such as C.I. Pigment Orange 61;

isoindoline pigments such as C.I. Pigment Orange 66; azomethine metal complex pigments such as C.I. Pigment Orange 68; and diketopyrrolopyrrole pigments such as C.I. Pigment Orange 71, 73, or 81.

Examples of brown pigments include: BONA lake pigments such as C.I. Pigment Brown 5; condensed azo pigments such as C.I. Pigment Brown 23, 41, or 42; and benzimidazolone pigments such as C.I. Pigment Brown 25 or 32.

Examples of purple pigments include: dyeing lake pigments such as C.I. Pigment Violet 1, 2, 3, or 27; naphthol AS pigments such as C.I. Pigment Violet 13, 17, 25, or 50; anthraquinone lake pigments such as C.I. Pigment Violet 5:1; quinacridon pigments such as C.I. Pigment Violet 19; dioxadine pigments such as C.I. Pigment Violet 23 or 37; perylene pigments such as C.I. Pigment Violet 29; benzimidazolone pigments such as C.I. Pigment Violet 32, and thioindigo pigments such as C.I. Pigment Violet 38.

Examples of black pigments include: indazine pigments such as C.I. Pigment Black 1; carbon black as C.I. Pigment Black 7; graphite as C.I. Pigment Black 10; magnetite as C.I. Pigment Black 11; anthraquinone pigments such as C.I. Pigment Black 20; and perylene pigments such as C.I. Pigment Black 31 or 32.

Examples of white pigments include: zinc oxide as C.I. Pigment White 4; titanium oxide as C.I. Pigment White 6; zinc sulfide as C.I. Pigment White 7; zirconium oxide (zirconium white) as C.I. Pigment White 12; calcium carbonate as C.I. Pigment White 18; aluminum oxide/silicon oxide (kaolin clay) as C.I. Pigment White 19; barium sulfate as C.I. Pigment White 21 or 22; aluminum hydroxide (alumina white) as C.I. Pigment White 23; silicon oxide as C.I. Pigment White 27; and calcium silicate as C.I. Pigment White 28.

Single species of inorganic particles may used as a white pigment, or an oxide, organic metal compound, or the like of silicon, aluminum, zirconium, titanium, or the like, or complex particles thereof with an organic compound may be used.

In particular, the titanium oxide is preferably used. The titanium oxide may be used in combination with other white pigments (including white pigments described above).

It is preferable to select the pigment, dispersing agent, or medium and set dispersion conditions and filtration conditions so as to make pigment particles have a volume average particle diameter of preferably from 0.005 μm to 0.5 μm, more preferably from 0.01 μm to 0.45 μm, and further more preferably from 0.015 μm to 0.4 μm.

In the invention, the average particle diameter and particle size distribution of particles may be determined by measuring a volume average particle diameter by dynamic light scattering method using a commercially available particle size analyzer such as a Nanotrac particle size analyzer UPA-EX150 (trade name, manufactured by Nikkiso Co., Ltd.).

(Water-Soluble Dye)

Examples of water-soluble dye usable in the invention include acid dyes and direct dyes. Acid dyes and direct dyes have structures containing an acid group as a solubilizing group. Examples of acid group include a sulfonic acid group and a salt thereof, a carboxylic acid group and a salt thereof, and a phosphoric acid group and a salt thereof. There may be only one acid group or plural acid groups, and a combination of different types of acid groups may be present. A chromophore included in a water-soluble dye may have a chemical structure of azo, phthalocyanine, triphenylmethane, xanthene, pyrazolone, nitro, stilbene, quinoline, methine, thiazole, quinoneimine, indigoid, rhodamine, anthraquinone, anthraquinone, or the like.

(Dispersive Dye)

In the invention, a dispersive dye may additionally used.

In the invention, only one type of colorant may be used, or a combination of two or more thereof may be used.

The content of colorant (Component (d)) in the ink composition may be appropriately selected in accordance with the conditions such as physical properties of the colorant (e.g., specific gravity, coloring property, or color tone) and how many colors of ink composition are used in combination for producing a printed article. The content of Component (d) is preferably from 0.1% by mass to 30% by mass, and more preferably from 0.5% by mass to 20% by mass, with respect to the total mass of the ink composition.

(Dispersing Agent)

When a pigment is used as a colorant, a pigment dispersing agent may be used if necessary when pigment particles are prepared. Examples of pigment dispersing agent which may be used in the invention include surfactants such as higher fatty acid salts, alkyl sulfate salts, alkyl ester sulfate salts, alkyl sulfonate salts, sulfosuccinic acid salts, naphthalene sulfonate salts, alkyl phosphate salts, polyoxyalkylene alkyl ether phosphate salts, polyoxyalkylene alkyl phenyl ether, polyoxyethylene polyoxypropylene glycol, glycerin ester, sorbitan ester, polyoxyethylene fatty acid amide, or amine oxide; and block copolymers, random copolymers, and salts thereof formed from at least two types of monomers selected from the group consisting of styrene, a styrene derivative, a vinyl naphthalene derivative, acrylic acid, an acrylic acid derivative, maleic acid, a maleic acid derivative, itaconic acid, an itaconic acid derivative, fumaric acid, and a fumaric acid derivative.

The ink composition of the invention may further include a self-dispersive pigment. A "self-dispersive pigment" as used herein refers to a pigment capable of being dispersed without a dispersing agent, and is preferably a pigment particle having a polar group on a surface thereof.

A pigment particle having a polar group on a surface thereof (hereinbelow, may be referred to as "pigment derivative") as used in the invention refers to a pigment obtained by directly modifying a surface of a pigment particle with a polar group, or an organic compound having an organic pigment nucleus having a polar group which is directly bonded thereto or bonded thereto via a joint.

Examples of polar group include a sulfonic acid group, a carboxylic acid group, a phosphoric acid group, a boric acid group, and a hydroxyl group, and a sulfonic acid group and a carboxylic acid group are preferable, and a sulfonic acid group is more preferable.

Above mentioned pigment particle having a polar group on the surface thereon can be obtained by appropriately select and use a known method.

A polar group present at a pigment surface may be a free group or may be in the form of a salt, or may have a counter salt. Examples of counter salt include inorganic salts (for example, inorganic salts thereof with lithium, sodium, potassium, magnesium, calcium, aluminum, nickel, ammonium, or the like) and organic salts (for example, organic salts thereof with triethylammonium, diethylammonium, pyridinium, triethanol ammonium, or the like), and a monovalent counter salt is preferable.

For a method of dispersing pigment, any one of various dispersing apparatus, such as a ball mill, a sand mill, an attritor, a roll mill, an agitator, a henschel mixer, a colloidal mill, an ultrasonic homogenizer, a pearl mill, a wet-type jet mill, or a paint shaker, may be used. Furthermore, it is preferable to use a centrifugal separator or a filter to remove coarse particles of pigment dispersion.

Regarding a preferable amount of dispersing agent added to an ink composition, it is preferable that the mass ratio D/P, in which P represents a mass of pigment in an ink composition and D represents a mass of a polymer dispersing agent in an ink composition, satisfies following equation: $0.01 \leq D/P \leq 2.0$, more preferably $0.03 \leq D/P \leq 1.5$, and further more preferably $0.05 \leq D/P \leq 0.6$.

When a dispersing treatment is carried out, a dispersing aid which is generally called a synergist (e.g., SOLSPERSE series such as SOLSPERSE 5000, 12000, or 22000 (all trade names, manufactured by The Lubrizol Corporation), and EFKA 6745 (trade name, manufactured by BASF Japan.)), and various surfactants and defoaming agents may preferably be added in addition to the dispersing agent, to increase dispersibility of pigment or wettability.

In the invention, when a pigment is dispersed, the dispersing treatment is preferably carried out by in such a manner that, after a pigment and a dispersing agent are mixed, the mixture is added in a polar organic solvent, followed by dispersing, or in such a manner that, after a polar organic solvent and a dispersing agent are mixed, a pigment is added to the mixture, followed by dispersing. For the dispersing treatment, any one of various dispersing apparatuses, such as a ball mill, a bead mill, a sand mill, a salt mill, an attritor, a roll mill, an agitator, a henschel mixer, a colloidal mill, an ultrasonic homogenizer, a pearl mill, a wet-type jet mill, or a paint shaker, may be used. In particular, a bead mill dispersing apparatus is preferable because of its excellent dispersing ability.

When bead mill dispersing is carried out, beads having a volume average particle diameter of preferably from 0.01 mm to 3.0 mm, more preferably from 0.05 mm to 1.5 mm, and further more preferably from 0.1 mm to 1.0 mm may be used to obtain a pigment dispersion having excellent stability.

<Other Additives>

The ink composition of the invention may further contain a known additive in addition to the component (a) to component (d) which are essential components, as long as the effect of the invention is not impaired. Hereinbelow, additives which may be used in the ink composition are described.

<Water-Soluble Organic Solvent>

The ink composition of the invention contains water, and preferably further contains a water-soluble organic solvent as an additional solvent depending on the purpose.

As used herein, the water-soluble organic solvent refers to an organic solvent having a solubility in water at 25° C. of 10% by mass or more.

Examples of water-soluble organic solvent which may be used in the invention include following solvents:

Alcohols such as methanol, ethanol, propanol, isopropanol, butanol, isobutanol, secondary butanol, tertiary butanol, pentanol, hexanol, cyclohexanol, or benzyl alcohol;

polyhydric alcohols such as ethylene glycol, diethylene glycol, triethylene glycol, polyethylene glycol, propylene glycol, dipropylene glycol, polypropylene glycol, butylene glycol, hexanediol, pentanediol, glycerin, hexanetriol, thiodiglycol, or 2-methylpropanediol;

polyhydric alcohol ethers such as ethylene glycol monomethyl ether, ethylene glycol monoethyl ether, ethylene glycol monobutyl ether, diethylene glycol monoethyl ether, diethylene glycol monomethyl ether, diethylene glycol monobutyl ether, propylene glycol monomethyl ether, propylene glycol monobutyl ether, tripropylene glycol monomethyl ether, dipropylene glycol monomethyl ether; oligo alkylene glycol monoalkyl ether such as triethylene glycol monomethyl ether, triethylene glycol monoethyl ether and triethylene glycol monobutyl ether; oligo alkylene glycol dialkyl ether such as dipropylene glycol dimethyl ether; ethylene glycol monomethyl ether acetate, ethylene glycol monophenyl ether, or propylene glycol monophenyl ether;

amines such as ethanolamine, diethanolamine, triethanolamine, N-methyl diethanolamine, N-ethyl diethanolamine, morpholine, N-ethylmorpholine, ethylenediamine, diethylenediamine, triethyleneteteramine, tetraethylene pentamine, polyethylene imine, pentamethyl diethylenetriamine, or tetramethyl propylenediamine;

amides such as formamide, N,N-dimethyl formamide, or N,N-dimethyl acetamide;

heterocyclic compounds such as ethylene carbonate, propylene carbonate, 3-methyl-2-oxazolidinone, 3-ethyl-2-oxazolidinone, 3-propyl-2-oxazolidinone, 1,3-dimethyl-2-imidazolidinone, 2-pyrrolidone, 1-methyl-2-pyrrolidone, or γ-butyrolactone;

sulfoxides such as dimethyl sulfoxide;

sulfones such as sulfolane; and other compounds such as urea, acetonitrile, or acetone.

The water-soluble organic solvent is preferably a heterocyclic compound or a polyhydric alcohol ether, and a combination thereof may be preferably used.

The heterocylic compound is preferably a compound represented by the following Formula (E1).

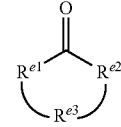

(E1)

In Formula (E1), $R^{e1}$ and $R^{e2}$ each independently represent —$CH_2$—, $NR^{e4}$— or —O—, provided that $R^{e1}$ and $R^{e2}$ do not simultaneously represent —$CH_2$—; $R^{e4}$ represents an alkyl group having from 1 to 3 carbon atoms, a hydroxyalkyl group having from 1 to 3 carbon atoms, a hydroxyl group or a hydrogen atom; $R^{e3}$ represents a hydrocarbon group represented by —$C_mH_{2m}$—, —$C_mH_{2m-2}$— or —$C_mH_{2m-4}$—; and m represents an integer of from 2 to 8.

In Formula (E1), the alkyl group or the hydroxyalkyl group represented by $R^{e4}$ may or may not have a substituent such as an alkoxy group. $R^{e4}$ is preferably an alkyl group having from 1 to 3 carbon atoms, a hydroxyalkyl group having from 1 to 3 carbon atoms, or a hydrogen atom, and more preferably an alkyl group having from 1 to 3 carbon atoms or a hydrogen atom. At least one of $R^{e1}$ or $R^{e2}$ is preferably —O—, and it is more preferable that both of $R^{e1}$ and $R^{e2}$ are —O—, in which case the organic solvent represented by Formula (E1) is a compound having a carbonate group.

In Formula (E1), $R^{e3}$ represents a hydrocarbon group represented by —$C_mH_{2m}$—, —$C_mH_{2m-2}$—, or $C_mH_{2m-4}$—, and m represents an integer of from 2 to 8. m in $R^{e3}$ is preferably an integer of from 2 to 6, more preferably an integer of from 2 to 4, and further preferably an integer of 2 or 3. $R^{e3}$ is preferably —$C_mH_{2m-2}$— or —$C_mH_{2m-2}$—, and more preferably —$C_mH_{2m}$—. $R^{e3}$ may be straight chain or branched.

Specifically, preferable examples of $R^{e3}$ include an ethylene group, 1-methylethylene group, and a propylene group. Among these, an ethylene group or a 1-methylethylene group is particularly preferable.

Specific examples of the organic solvent represented by Formula (E1) include ethylene carbonate, propylene carbonate, 3-methyl-2-oxazolidinone, 3-ethyl-2-oxazolidinone, 3-propyl-2-oxazolidinone, 1,3-dimethyl-2-imidazolidinone, 2-pyrrolidone, 1-methyl-2-pyrrolidone, and γ-butyrolactone. However, the organic solvent according to the invention is not limited thereto.

Preferable examples of the heterocyclic compound include 2-pyrrolidone and γ-butyrolactone, and 2-pyrrolidone is particularly preferable. Particularly, a solvent having a high boiling point is preferably used, and the boiling point thereof at normal pressure is preferably 120° C. or higher and more preferably 150° C. or higher.

Preferable examples of the polyhydric alcoholic ethers include so-called glycol ethers. A glycol ether is a compound having, in a molecule thereof, a structure represented by the following Formula (E2).

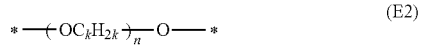

$$*\!-\!(\!-\!OC_kH_{2k}\!-\!)_n\!-\!O\!-\!*\quad (E2)$$

In Formula (E2), k represents an integer of 2 or 3; n represents an integer of from 1 to 4; and the symbol * represents a bonding site.

Specifically, preferable examples of the glycol ethers include oligoalkylene glycol monoalkyl ethers and oligoalkylene glycol dialkyl ethers, and more preferable examples of the glycol ethers include tripropylene glycol monomethyl ether, dipropylene glycol monomethyl ether, and dipropylene glycol dimethyl ether, and 2-dipropylene glycol monomethyl ether is particularly preferable.

Only one type of water-soluble organic solvents may be used, or a combination of two or more thereof may be used. A total amount of the water-soluble organic solvent added to an ink composition is from 0.1% by mass to 60% by mass, and preferably from 0.5% by mass to 40% by mass.

(Surfactant)

The ink composition of the invention may additionally contain a surfactant. Examples of preferable surfactant include anionic surfactants such as dialkyl sulfosuccinates, alkyl naphthalene sulfonates, or fatty acid salts; nonionic surfactants such as polyoxyethylene alkyl ethers, polyoxyethylene alkyl allyl ethers, acetylene glycols, or polyoxyethylene-polyoxypropylene block copolymers; and cationic surfactants such as alkyl amine salts or quaternary ammonium salts. Among theses, an anionic surfactant and a nonionic surfactant are particularly preferably used.

In the invention, a polymer surfactant may be additionally used. Any one of water-soluble resins mentioned below is preferably used as the polymer surfactant. Examples of water-soluble resins include styrene-acrylic acid-alkyl acrylate copolymers, styrene-acrylic acid copolymers, styrene-maleic acid-alkyl acrylate copolymers, styrene-maleic acid copolymers, styrene-methacrylic acid-alkyl acrylate copolymers, styrene-methacrylic acid copolymers, styrene-maleic acid half ester copolymers, vinylnaphthalene-acrylic acid copolymers, and vinylnaphthalene-maleic acid copolymers.

(Latex)

A latex may be added to the ink composition of the invention. Examples of latex which may be used in the invention include styrene-butadiene copolymers, polystyrene, acrylonitrile-butadiene copolymers, acrylic acid ester copolymers, polyurethane, silicone-acrylic copolymers, and acryl-modified fluorine resins. The latex may be a latex in which polymer particles are dispersed using an emulsifier, or may be a soap free latex in which polymer particles are dispersed without using an emulsifier. As the emulsifiers, a surfactant may be used, and it is preferable to use a polymer having a water-soluble group such as a sulfonic acid group or a carboxylic acid group, examples of which include a polymer having graft bonds of soluble groups, and a polymer obtained from a monomer having a soluble group and a monomer having an insoluble moiety.

(Aqueous Polymer)

An aqueous polymer different from the polymer (a) may be additionally added to the ink composition of the invention.

Natural polymers are a preferable example of the aqueous polymer. Specific examples thereof include proteins such as animal glue, gelatin, casein, or albumin; natural rubbers such as gum arabic or gum tragacanth; glucosides such as saponin; alginic acid and alginic acid derivatives such as propylene glycol alginate, triethanolamine alginate, or ammonium alginate; and cellulose derivatives such as methyl cellulose, carboxymethylcellulose, hydroxyethylcellulose, or ethylhydroxycellulose.

Other examples of preferable aqueous polymer include synthetic polymers. Examples thereof include acrylic resins such as polyvinyl alcohols, polyvinyl pyrrolidones, polyacrylic acids, acrylic acid-acrylonitrile copolymers, potassium acrylate-acrylonitrile copolymers, vinyl acetate-acrylic ester copolymers, or acrylic acid-acrylic acid ester copolymers; styrene acrylate resins such as styrene-acrylic acid copolymers, styrene-methacrylic acid copolymers, styrene-methacrylic acid-acrylic acid ester copolymers, styrene-α-methyl styrene-acrylic acid copolymers, or styrene-α-methyl styrene-acrylic acid-acrylic acid ester copolymers; styrene-maleic acid copolymers, styrene-maleic anhydride copolymers, vinyl naphthalene-acrylic acid copolymers, vinylnaphthalene-maleic acid copolymers, and vinyl acetate copolymers and salts thereof, such as vinyl acetate-ethylene copolymers, vinyl acetate-fatty acid vinyl ethylene copolymers, vinyl acetate-maleic acid ester copolymers, vinyl acetate-crotonic acid copolymers, vinyl acetate-acrylic acid copolymers. Of these, nonionic aqueous polymers are preferable and polyvinyl pyrrolidones are particularly preferable.

The aqueous polymer which may be used in the invention has a molecular weight of preferably from 1,000 to 200,000, and more preferably from 3,000 to 20,000.

The amount of aqueous polymer to be added is preferably from 10% by mass to 1,000% by mass, and more preferably from 50% by mass to 200% by mass, with respect to dissolved pigment.

(Polymerization Initiator)

The aqueous ink composition of the invention may further include a polymerization initiator as long as the effect of the invention is not impaired. The polymerization initiator is preferably water soluble. Regarding the degree of water solubility, it is preferable that the polymerization initiator has a solubility in distilled water at 25° C. in an amount of 0.5% by mass or more, more preferably in an amount of 1% by mass or more, and particularly preferably in an amount of 3% by mass or more.

A non-aqueous polymerization initiator may be used in a dispersed state.

In the invention, a polymerizable initiator selected from the group consisting of α-hydroxy ketones, α-amino ketones, and acylphosphine oxides is preferably used. Specifically, examples of polymerization initiators that can be used include water-soluble polymerization initiators such as 1-[4-(2-hydroxyethyl)-phenyl]-2-hydroxy-2-methyl]-1-propane-1-one, 1-hydroxycyclohexyl phenyl ketone, and 2-hydroxy-2-methyl-1-phenylpropane-1-one, and non-aqueous polymerization initiators such as [bis(2,4,6-trimethylbenzoyl)-phenylphosphine oxide].

(Sensitizing Dye)

In the invention, a known sensitizing dye may be additionally used, and it is preferable to use a sensitizing dye in combination. Regarding the solubility of a sensitizing dye, it is preferable that a sensitizing dye dissolves in distilled water at room temperature in an amount of 0.5% by mass or more, more preferably 1% by mass or more, and particularly preferably 3% by mass or more.

Examples of sensitizing dyes that can be used include a polymerization initiator in which water-insoluble polymerization initiator is dispersed.

Examples of known sensitizing dyes that can be used include N-[2-hydroxy-3-(3,4-dimethyl-9-oxo-9H-thioxanthene-2-yloxy) propyl]-N,N,N,-trimethyl aluminum chloride, benzophenone, thioxanthone, anthraquinone derivatives, and 3-acyl coumalin derivatives, terphenyl, styryl ketone, and 3-(aroylmethylene)thiazoline, a camphor quinone, eosin, rhodamine, and erythrosine, modified products thereof obtained by imparting water-solubility, and a dispersion thereof. The sensitizing dyes described in JP-A No. 2010-24276 and the sensitizing dyes described in JP-A No. 6-107718 are also suitable for use.

If necessary, for the purpose of improving properties such as ejection stability, compatibility with a print head or ink cartridge, storage stability, or image preserbability, the ink according to the invention may contain, in addition to the above mentioned constitutional components, any one of various known additives selected from a viscosity controller, a surface tension controller, a specific resistance controller, a film-forming agent, an ultraviolet absorber, an antioxidant, an anti-decoloration agent, a fungicide, a corrosion preventing agent, a solid humectant, silica fine particles, and the like. Examples thereof include liquid paraffin, dioctyl phthalate, tricresyl phosphate, oil droplet particles of silicone oil or the like, an ultraviolet absorber as disclosed in JP-A Nos. 57-74193, 57-87988, and 62-261476, a anti-decoloration agent as disclosed in JP-A Nos. 57-74192, 57-87989, 60-72785, 61-146591, 1-95091, and 3-13376, a fluorescent bleaching agent as disclosed in JP-A Nos. 59-42993, 59-52689, 62-280069, 61-242871, and 4-219266, and a pH controller such as sulfuric acid, phosphoric acid, citric acid, sodium hydroxide, potassium hydroxide, or potassium carbonate.

<Method of Producing Ink Composition>

A method of producing the ink composition of the invention is not particularly limited, and the ink composition may be prepared by stirring, mixing, and dispersing respective components using a container-driven medium mill such as a ball mill, a centrifugal mill, or a planetary balls mill, a high-speed rotary mill such as a sand mill, a medium agitating mill such as such as a mixing vessel-type mill, or a simple dispersion apparatus such as a disper. The order of addition of respective components is arbitrary. At the time of addition or after addition, the components are uniformly mixed using a simple stirring apparatus such as a three-one motor, a magnetic stirrer, a disper, or a homogenizer. Alternatively, a mixing apparatus such as a line mixer may be used for mixing. In order for ultra-fining of dispersed particles, a dispersing apparatus such as a bead mill or a high-pressure jet mill may be used for mixing. Depending on the type of pigment, polymer dispersing agent, or the like, an anionic resin may be added at the time of pre-mixing carried out before a pigment dispersing treatment.

The ink composition of the invention preferably has a surface tension at 25° C. of from 20 to 40 mN/m. The surface tension may be measured under conditions of 25° C. using an automatic surface tensiometer CBVP-Z (trade name, manufactured by Kyowa Interface Science Co., Ltd.). The viscosity is preferably from 1 to 40 mPa·s, and more preferably from 3 to 30 mPa·s. The viscosity may be measured under conditions of 25° C. using a viscometer TV-22 (trade name, manufactured by Toki Sangho Co., Ltd.).

<Image Forming Method>

An image forming method of the invention includes a process of applying the ink composition to a recording medium (i.e., ink application process), and a process of irradiating the ink composition with active energy radiation (i.e., irradiation process). By performing these processes, an image is formed from the ink composition fixed on a recording medium.

(Ink Application Process)

Hereinbelow, the ink application process in the image forming method of the invention is described. The ink application process is not restricted as long as it is a process of applying the ink composition to a recording medium.

An inkjet recording apparatus used in the inkjet recording method of the invention is not particularly limited, and may be arbitrary selected from known inkjet recording apparatuses capable of providing an intended resolution. In other words, any one of known inkjet recording apparatuses including commercially available products enables ejection of the ink composition to a recording medium in the inkjet recording method of the invention.

An example of inkjet recording apparatuses which may be used in the invention is an apparatus having at least an ink supply system, a temperature sensor, and a heating device.

The ink supply system has, for example, a base tank, a supply pipe, an ink supply tank that is arrange at a position adjacent to an inkjet head, a filter, and a piezo-type inkjet head. The piezo-type inkjet head is capable of moving and ejecting multi-sized dots of preferably 1 to 100 pl, and more preferably 8 to 30 pl, at a resolution of preferably 320×320 dpi to 4000×4000 dpi, more preferably 400×400 dpi to 1600× 1600 dpi, and further more preferably 720×720 dpi. Herein, "dpi" as used in the invention indicates the number of dots per 2.54 cm.

Since it is desirable to keep the ink composition to be ejected at a certain temperature, it is preferable that the inkjet recording apparatus has a temperature stabilizing device that stabilizes the temperature of the ink composition. The temperature of all of pipe systems and members of the inkjet recording apparatus, including the parts thereof from the ink tank (and an intermediate tank, if present) to a nozzle ejection surface, is maintained at a certain level. In other words, the parts from the ink supply tank to the inkjet head may be thermally insulated and/or heated.

The method of controlling temperature is not particularly limited. For example, it is preferable to place temperature sensors at plural positions on respective pipes, and control the heating in accordance with the ink flow rate and environment temperature, for example. A temperature sensor may be placed at a position adjacent to an ink supply tank and a nozzle of an inkjet head. Furthermore, it is preferable that the head unit to be heated is thermally shielded or insulated so as not to be affected by the outside temperature of the apparatus body. In order to reduce the printer start-up time necessary for heating, or to reduce the loss in thermal energy, it is preferable to reduce the thermal capacity of the entire heating unit, simultaneously with thermal insulation from other parts.

The ejection of the ink composition of the invention using the inkjet recording apparatus is preferably carried out after the viscosity of the ink composition is decreased to preferably from 3 to 15 mPa·s, and more preferably from 3 to 13 mPa·s by heating the ink composition to preferably 25 to 80° C., and more preferably from 25 to 50° C. In particular, it is preferable to use the ink composition of the invention having an ink viscosity at 25° C. of 50 mPa·s or less, because ink ejection is favorably carried out. By using this method, a high ejection stability is achieved.

The temperature of the ink composition upon ejection is preferably maintained at a certain temperature as well as possible. Accordingly, in the invention, it is appropriate to control the ink temperature within a range ±5° C. of a set temperature, preferably within a range ±2° C. of a set temperature, and more preferably within a range ±1° C. of a set temperature.

In the invention, a recording medium is not particularly limited, and any one of recording media known as supports or recording materials. Examples of recording medium include paper, paper laminated with plastic (such as polyethylene, polypropylene, or polystyrene), metal plates (which are made from aluminum, zinc, copper, or the like), plastic films (which are made from a polyvinyl chloride resin, cellulose diacetate, cellulose triacetate, cellulose propionate, cellulose butyrate, cellulose acetate butyrate, cellulose nitrate, polyethylene terephthalate, polyethylene, polystyrene, polypropylene, polycarbonate, polyvinyl acetal, or the like), and a paper sheet or plastic film having the metal mentioned above laminated or deposited thereon. Specifically, since the ink composition of the invention has an excellent adhesiveness, it may be preferably used for a non-absorbable recording medium as the recording medium. From the viewpoints of adhesiveness, a plastic base material made from polyvinyl chloride, polyethylene terephthalate, polyethylene, or the like is preferable, a polyvinyl chloride resin base material is more preferable, and a polyvinyl chloride resin sheet or film is further more preferable.

(Irradiation Process)

Hereinbelow, the irradiation process in the inkjet recording method of the invention is described. The irradiation process in the invention is not particularly limited, as long as it includes irradiating the ink composition which has been applied to the recording medium with active energy radiation. By applying an active energy ray to the ink composition of the invention, cross-linking reaction of compounds in the ink composition is promoted, which results in fixation of image and improvement in solvent resistance of a printed article. By the irradiation process, cross-linking reaction of polymer (a) proceeds, and a cross-linked structure represented by following Formula (5) is formed in the ink composition.

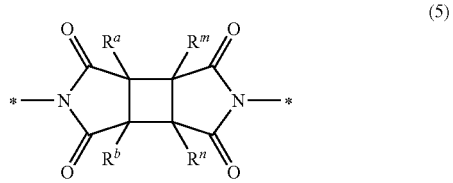

(5)

In Formula (5), $R^a$, $R^b$, $R^m$, and $R^n$ each independently represent an alkyl group having 1 to 4 carbon atoms; $R^a$ and $R^b$ may be bonded to each other to form a 4-membered to 6-membered ring; and $R^m$ and $R^n$ may be bonded to each other to form a 4-membered to 6-membered ring. * represents a bonding site. $R^a$ and $R^b$ have the same definitions as those of Formula (1), respectively, and the preferable ranges thereof are also the same. $R^m$ has the same definition as $R^a$ of Formula (1), and the preferable range thereof is also the same. $R^n$ has the same definition as $R^b$ of Formula (1), and the preferable range thereof is also the same.

Examples of active energy ray which may be used in the irradiation process include an ultraviolet ray (hereinbelow, may be referred to as "UV light"), a visible ray, and an electron beam, and UV light is preferably used.

Although it depends on the absorption property of a sensitizing dye optionally used, the peak wavelength of UV light is, for example, preferably from 200 nm to 405 nm, more preferably from 250 nm to 405 nm, and further more preferably from 250 nm to 390 nm.

The power output of UV light is preferably 2,000 mJ/cm$^2$ or less, more preferably from 10 to 2,000 mJ/cm$^2$, further more preferably from 20 to 1,000 mJ/cm$^2$, and particularly preferably from 50 to 800 mJ/cm$^2$.

When UV light is used, it is preferable to apply UV light at an illuminance at the exposure surface of from 10 to 2,000 mW/cm$^2$, and preferably from 20 to 1,000 mW/cm$^2$.

As a UV light source, a mercury lump, a gas laser, a solid laser, or the like is mainly used. Furthermore, a mercury lump and a metal halide lump are widely known. Meanwhile, shift for GaN semiconductor ultraviolet-emitting devices is extremely useful from industrial and environmental viewpoints. Furthermore, LEDs (UV-LEDs) and LDs (UV-LDs) have been expected for serving as a photocurable inkjet light source because they have small sizes and long life, while being highly efficient and inexpensive.

The ink composition of the invention is irradiated with such UV light for 0.01 second to 120 seconds, and preferably for 0.1 second to 90 seconds.

Irradiation conditions and basic irradiation method are disclosed in JP-A No. 60-132767. Specifically, a method in which light sources are arranged at both sides of a head unit including the ink ejection device, and the head unit and light sources are moved in a so-called shuttle manner, is preferable, or a method in which another light source is used without movement thereof may be preferable. The application of an active energy ray is carried out after a certain time passed (for example, 0.01 to 60 seconds, preferably 0.01 to 30 seconds, and more preferably 0.01 to 15 seconds) after the ink impaction.

(Heat Drying Process)

It is preferable that the ink composition applied on a recording medium is fixed thereon by evaporating the water (c), and, if present, a water-soluble organic solvent optionally used if necessary, using a heating device. In the following, a process of heating and fixing the ejected ink composition of the invention will be explained. This process of drying by heating is herein referred to as "heat drying process".

The heating device is not limited as long as it is capable of drying the water (c) and an optional water-soluble organic solvent, which are present in the ink composition. Examples thereof include a heat drum, hot air, an infrared lump, a heat oven, and a heating plate.

The heating temperature is not particularly limited as long as the water (c) and an optional water-soluble organic solvent, which are present in the ink composition, evaporate, and a film of the polymer (a) and a polymer binder optionally added if necessary is formed. When the heating temperature is 40° C. or more, these effects are achieved, and the heating temperature is preferably from about 40 to 150° C., and more preferably from about 40 to 80° C.

The time for drying and/or heating is not particularly limited as long as the water (c) and an optional water-soluble organic solvent, which are present in the ink composition, evaporate, and a film is formed from the resin agent, and may be appropriately set depending on the composition of the ink composition to be used and/or printing speed.

The solvent-type ink composition fixed by heating may be irradiated with UV light for optical fixation, if necessary. It is preferable to conduct optical fixation using UV light.

The following are exemplary embodiments of the invention. However, the invention is not limited to these exemplary embodiments.

<1> An ink composition comprising:
(a) a polymer comprising a repeating unit (a1)) having a group represented by the following Formula (1) and a repeating unit (a2) having a hydrophilic group;
(b) a radical polymerizable compound;
(c) water; and
(d) a colorant.

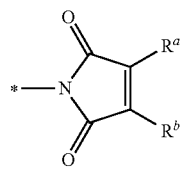

In Formula (1), each of $R^a$ and $R^b$ independently represents an alkyl group having from 1 to 4 carbon atoms; $R^a$ and $R^b$ may be bound to each other to form a 4- to 6-membered alicyclic structure; and * represents a bonding site.

<2> The ink composition according to <1>, wherein the (b) radical polymerizable compound is a compound having a (meth)acryloyloxy group or a (meth)acrylamide group.

<3> The ink composition according to <1> or <2>, wherein a content of the (a) polymer is from 0.5% by mass to 20% by mass, and a content of the (b) radical polymerizable compound is from 1% by mass to 20% by mass, with respect to the ink composition.

<4> The ink composition according to any one of <1> to <3>, wherein the repeating unit (a1) is a repeating unit represented by the following Formula (1').

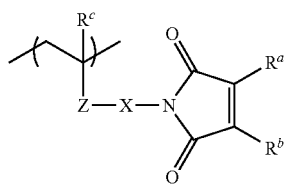

In Formula (1'), each of $R^a$ and $R^b$ independently represents an alkyl group having from 1 to 4 carbon atoms; $R^a$ and $R^b$ may be bound to each other to form a 4- to 6-membered alicyclic structure; $R^c$ represents a hydrogen atom or a methyl group; Z represents a single bond, —COO—*, or —CONR$^d$—*; $R^d$ represents a hydrogen atom or an alkyl group having from 1 to 4 carbon atoms; * represents a site bonding to X; and X represents a divalent organic group.

<5> The ink composition according to <4>, wherein the divalent organic group represented by X is an alkylene group having from 2 to 20 carbon atoms, the alkylene group optionally comprising at least one selected from the group consisting of an ether bond, an ester bond, an amide bond, a urethane bond, and an arylene group.

<6> The ink composition according to any one of <1> to <5>, wherein the repeating unit (a2) is a repeating unit represented by the following Formula (2).

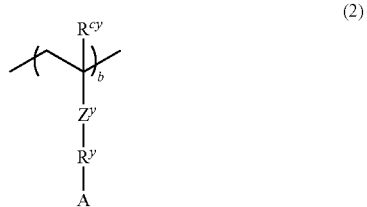

In Formula (2), $R^{cy}$ represents a hydrogen atom or a methyl group; $Z^y$ represents —COO—*, —CONR$^{dy}$—*, or a single bond; $R^{dy}$ represents a hydrogen atom or an alkyl group having from 1 to 4 carbon atoms; $R^y$ represents a group selected from the group consisting of a single bond, an alkylene group, an arylene group, and an aralkylene group; A represents a hydrophilic group; and * represents a site bonding to R.

<7> The ink composition according to any one of <1> to <6>, wherein the hydrophilic group in the repeating unit (a2) is at least one group selected from the group consisting of an amide group, a carbamoyl group, an alkyl-substituted carbamoyl group, an alcoholic hydroxyl group, a group having a polyalkyleneoxy structure, and a residue obtained by removing one hydrogen atom from a heterocyclic compound that includes a nitrogen atom or an oxygen atom.

<8> The ink composition according to any one of <1> to <6>, wherein the hydrophilic group in the repeating unit (a2) is at least one group selected from the group consisting of a carboxyl group, a sulfo group, a phosphoric acid group, a phosphonic acid group, a phenolic hydroxyl group and salts thereof, and a quaternary ammonium salt.

<9> The ink composition according to any one of <1> to <8>, wherein a content of the (c) water is from 10% by mass to 97% by mass with respect to the ink composition.

<10> The ink composition according to any one of <1> to <9>, further comprising (e) a water-soluble organic solvent.

<11> The ink composition according to <10>, wherein the (e) water-soluble organic solvent is a compound represented by the following Formula (E1).

In Formula (E1), each of $R^{e1}$ and $R^{e2}$ independently represents —CH$_2$—, NR$^{e4}$—, or —O—; $R^{e1}$ and $R^{e2}$ do not simultaneously represent —CH$_2$—; $R^{e4}$ represents an alkyl group having from 1 to 3 carbon atoms, a hydroxyalkyl group having from 1 to 3 carbon atoms, a hydroxyl group, or a hydrogen atom; $R^{ea}$ represents a hydrocarbon group represented by —C$_m$H$_{2m}$—, —C$_m$H$_{2m-2}$—, or —C$_m$H$_{2m-4}$—; and m represents an integer of from 2 to 8.

<12> The ink composition according to <11>, wherein the (e) water-soluble organic solvent is 2-pyrrolidone or γ-butyrolactone.

<13> An inkjet recording ink comprising the ink composition according to any one of <1> to <12>.

<14> An image forming method comprising:
applying the ink composition according to any one of <1> to <13> onto a recording medium; and
irradiating the ink composition with active energy rays.

EXAMPLES

Hereinbelow, the invention is described in more detail, but the invention is not limited to these examples. It should be noted that "part" and "%" are in terms of mass unless otherwise noted.

Materials of pigment dispersions and ink compositions used in Examples and Comparative Examples are described below.

<Synthesis of Polymer Dispersing Agent D-1>

To a 500 ml-volume three-necked flask equipped with a stirrer and a condenser, 44 g of methyl ethyl ketone was added and heated to 72° C. under a nitrogen atmosphere. To this flask, a solution obtained by dissolving 0.43 g of dimethyl 2,2'-azobisisobutyrate, 30 g of benzyl methacrylate, 5 g of methacrylic acid, and 15 g of methyl methacrylate in 25 g of methyl ethyl ketone was added dropwise over 3 hours. After completion of dropping, the mixture was left stand for reaction for 1 hour, and a solution obtained by dissolving 0.21 g of dimethyl 2,2'-azobisisobutyrate in 1 g of methyl ethyl ketone was added thereto, followed by heating at 78° C. for 4 hours. The resultant reaction solution was subjected to re-precipitation twice using an excess amount of hexane, and a precipitated resin was dried, to thereby obtain 43 g of Polymer dispersing agent D-1.

The composition of the obtained resin was confirmed by $^1$H-NMR, and the weight average molecular weight (Mw) thereof measured by GPC was 42,000. Furthermore, an acid value thereof was measured by a method in accordance with a general test method for acid value (e.g., JIS K0070 (1992)), and was found to be 65.4 mgKOH/g.

<Preparation of Dispersion of Resin-Coated Pigment>
(Resin-Coated Cyan Pigment Dispersion (C))

First, 10 parts of Pigment Blue 15:3 (PHTHALOCYANINE BLUE A220, trade name, manufactured by Dainichiseika Color & Chemicals Mfg. Co., Ltd.), 5 parts of Polymer dispersion D-1 mentioned above, 42 parts of methyl ethyl ketone, 5.5 parts of 1 mol/L NaOH aqueous solution, and 87.2 parts of ion-exchange water were mixed, and subjected to a dispersion treatment using a bead mill with 0.1 mmφ zirconia beads for 2 to 6 hours.

Methyl ethyl ketone was removed from the obtained dispersion under reduced pressure at 55° C., and part of water was also removed, to thereby obtain a resin-coated cyan pigment dispersion C having a pigment concentration of 10.2% by mass.

(Resin-Coated Magenta Pigment Dispersion (M))
A resin-coated magenta pigment dispersion M was obtained in the same manner as in the preparation of the resin-coated cyan pigment dispersion except that phthalocyanine blue A220 used as a pigment was changed to CHROMOPHTHAL JET MAGENTA DMQ (Pigment Red 122, manufactured by BASF Japan.).

(Resin-Coated Yellow Pigment Dispersion (Y))
A resin-coated yellow pigment dispersion Y was obtained in the same manner as in the preparation of the resin-coated cyan pigment dispersion except that phthalocyanine blue A220 used as a pigment was changed to IRGALITE YELLOW (Pigment Yellow 74, manufactured by BASF Japan.).

(Resin-Coated Black Pigment Dispersion (K))
A resin-coated black pigment dispersion K was obtained in the same manner as in the preparation of the resin-coated cyan pigment dispersion except that phthalocyanine blue A220 used as a pigment was changed to CAB-O-JET™ 200 (carbon black, manufactured by Cabot Corporation).

<Polymer (a)>
Polymers (A-1), (A-2), and (A-3) as polymers (a) were synthesized by reference to JP-A No. 52-988. The structures of polymers (A-1), (A-2), and (A-3) are shown below.

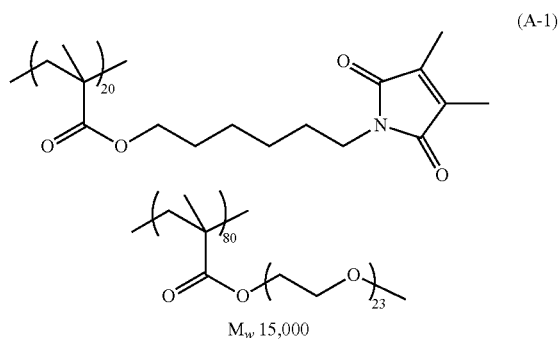

(A-1)

$M_w$ 15,000

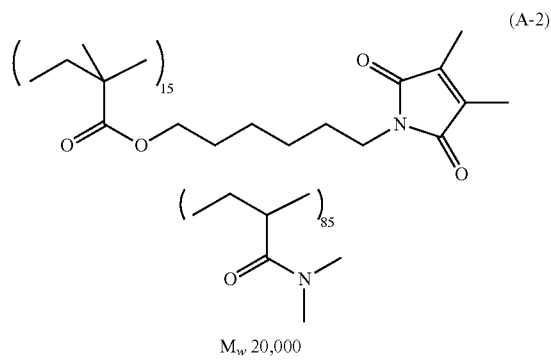

(A-2)

$M_w$ 20,000

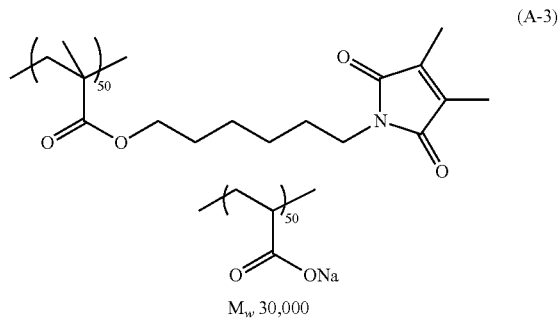

(A-3)

$M_w$ 30,000

<Radical Polymerizable Compound (b)>
Polymerizable compounds in Table 1 are shown below.

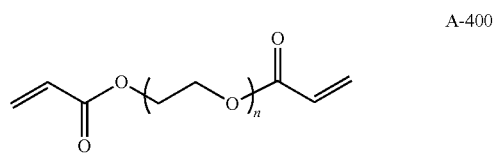

A-400 n = 9

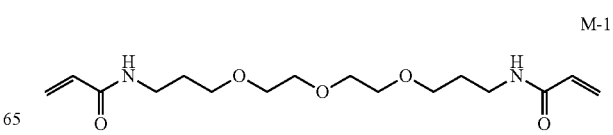

M-1

A-400 represents NK ester A-400 (trade name, manufactured by Shin-Nakamura Chemical Co., Ltd., poly(ethylene glycol)diacrylate, Mn: 400).

M-1 was synthesized as follows.

—Synthesis of M-1—

To a 1 L three-necked flask equipped with a stirrer, 40.0 g (182 mmol) of 4,7,10-trioxa-1,13-tridecanediamine, 37.8 g (450 mmol) of sodium hydrogen carbonate, 100 g of water, and 300 mL of tetrahydrofuran were added, and 35.2 g (389 mmol) of acryloyl chloride was added dropwise over 20 minutes while cooling in an ice bath. After completion of dropwise addition, stirring was performed for 5 hours at room temperature, and then tetrahydrofuran was distilled off from the resultant reaction mixture under reduced pressure. Subsequently, extraction of a water phase layer with 200 mL of ethylene acetate was carried out 4 times. After the organic phase layer obtained was dried with magnesium sulfate, filtration was performed, and the solvent was distilled off under reduced pressure, thereby obtaining 35.0 g (107 mmol, yield: 59%) of a white solid of a target polymerizable compound M-1.

<Water-Soluble Organic Solvent>

2-pyrrolidone (manufactured by Sigma-Aldrich Japan K. K.)

Dipropylene glycol monomethyl ether (manufactured by Sigma-Aldrich Japan K. K.)

<Comparative Compound>

Comparative Compound (P-1) was synthesized by reference to JP-A No. 52-988. Comparative Compound (P-2) was synthesized by reference to the compound used in the Examples section of JP-A No. 2007-119449.

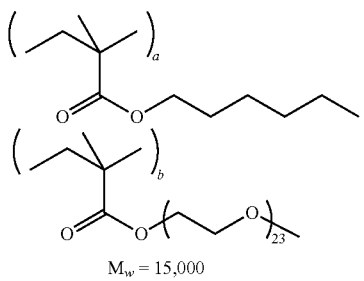

P-1

$M_w = 15,000$
a:b = 40/60

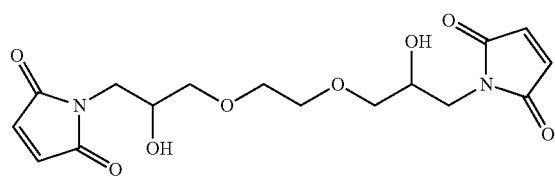

P-2

<Polymerization Initiator>

The polymerization initiator in Table 1 represents IRGACURE 2959 (trade name, manufactured by BASF Japan Ltd.).

<Surfactant>

The surfactant shown in Table 1 represents GLIDE 100 (trade name, manufactured by Evonik Tego Chemie GmbH).

<Sensitizer>

The sensitizer (S-1) shown in Table 1 represents N-[2-hydroxy-3-(3,4-dimethyl-9-oxo-9H-thioxanthene-2-yloxy) propyl-N,N,N-trimethylaminium chloride (product name, manufactured by Sigma-Aldrich Co. LLC.).

Among the compounds used in Examples and Comparative Examples, a compound without indication of a manufacturer was synthesized by a known method or by applying a known method.

<Preparation of Ink>

Ink compositions of Examples 1 to 8 and Comparative Examples 1-4, having the compositions shown in Table 1 below, were each prepared using the dispersions obtained (dispersion C, dispersion M, dispersion Y, and dispersion K) in the following manner. The ingredients for each composition shown in Table 1 were stirred with a mixer (L4R, trade name, manufactured by Silverson Machines, Inc.) at 2,500 rpm for 10 minutes, and was filled into a plastic disposable syringe, and was filtered through a filter that was made from polyvinylidene fluoride (PVDF) and that had a pore diameter of 5 μm (Millex-SV, trade name, manufactured by Millipore Corporation, diameter: 25 mm), whereby a final ink was obtained.

The viscosities of the ink compositions as measured with VISCOMETER TV-22 (trade name, manufactured by Toki Sangyo Co. Ltd) at 25° C. were each 30 mPa·s or less, which is in a range in which inkjet ejection can be performed.

Each of the obtained inks was applied, in a thickness of 12 μm, to a vinyl chloride sheet (AVERY 400 GLOSS WHITE PERMANENT, trade name, manufactured by Avery Dennison Japan K.K.), using K hand coater with a No. 2 bar thereof (trade name, manufactured by RK Print Coat Instruments Ltd.). Then, water was removed by drying at 60° C. for 3 minutes.

The following fixability evaluation was carried out using the resultant coating film. The evaluation results are shown in Table 1.

<Fixability Evaluation>

The resultant coating film was exposed to light with a Deep UV lamp (SP-7, trade name, manufactured by Ushio Inc.) in a condition in which an energy of 1000 mJ/cm² is applied. The degree of fixing on the film surface was evaluated by touching. When the surface was still tacky, the exposure to light was repeated until the surface ceased to be tacky, and fixability was evaluated based on the amount of exposure applied until the surface ceased to be tacky.

A: Tackiness disappears when the exposure to light has been carried out once.

B: Tackiness disappears when the exposure to light has been carried out twice or 3 times.

C: Tackiness disappears when the exposure to light has been carried out 4 or 5 times.

D: Tackiness does not disappear even after the exposure to light is carried out 6 times or more.

Evaluation of solvent resistance was carried out using the ink composition obtained and the printed matter prepared in the fixability evaluation. The evaluation results are shown in Table 1.

<Solvent Resistance Evaluation>

The coating film obtained in the fixability evaluation was further exposed to light with a Deep UV lamp (SP-7, trade name, manufactured by Ushio Inc.) in a condition in which an energy of 8000 mJ/cm² was applied. The surface of the printed matter exposed in the energy condition of 8000 mJ/cm² was rubbed with a cotton swab impregnated with isopropyl alcohol, and evaluation was performed according to the following criteria.

A: No change in the image was observed even after rubbed 10 times or more.
B: The optical density of the image was reduced by rubbing 5 to 9 times.
C: The optical density of the image was reduced by rubbing 2 to 4 times.
D: The optical density of the image was notably reduced by rubbing once.

<Ejection Recovery Property Evaluation>

As an inkjet recording device, a commercially available inkjet printer (SP-300V, trade name, manufactured by Roland DG Corporation) was prepared. The ink composition obtained was loaded into the inkjet printer, and was ejected onto a vinyl chloride sheet (AVERY 400 GLOSS WHITE PERMANENT, trade name, Avery Dennison Japan K.K.), from a head in a standard printing mode for ten minutes, to form a solid image and a fine line. Ejection was paused for 10 minutes, a solid image and a fine line were again recorded by ejection in a standard printing mode for ten minutes, and the image (5 cm×5 cm) obtained was observed. The image observed was visually evaluated in accordance with the following evaluation criteria.
A: Occurrence of dot deficiency due to ejection failure or the like was not observed, and an excellent image was obtained.
B: Although occurrence of dot deficiency due to ejection failure or the like was slightly observed, the extent of the dot deficiency was practically acceptable.
C: Occurrence of dot deficiency due to ejection failure or the like was observed, and the image was a practically intolerable.
D: The ink composition could not be ejected.

TABLE 1

| | Polymer (a) (*P-1 and P-2 are comparative compounds.) | | Polymerizable Compound (b) | | (c) Water | (d) Colorant | | (e) Organic Solvent | |
|---|---|---|---|---|---|---|---|---|---|
| | Abbrev. | Amt. Used (g) | Name | Amt. Used (g) | Amt. Used (g) | Pigment Dispersion | Amt. Used (g) | Name | Amt. Used (g) |
| Example 1 | A-1 | 10 | A-400 | 7 | 69.9 | Dispersion Y | 10 | — | — |
| Example 2 | A-2 | 10 | A-400 | 7 | 64.7 | Dispersion Y | 10 | 2-pyrrolidone | 5 |
| Example 3 | A-3 | 10 | M-1 | 2 | 71.9 | Dispersion C | 8 | 2-pyrrolidone | 5 |
| Example 4 | A-3 | 5 | M-1 | 10 | 67.9 | Dispersion C | 8 | 2-pyrrolidone | 6 |
| Example 5 | A-3 | 2 | M-1 | 15 | 66.9 | Dispersion C | 8 | 2-pyrrolidone | 5 |
| Example 6 | A-3 | 10 | A-400 | 22 | 49.9 | Dispersion M | 10 | 2-pyrrolidone | 5 |
| Example 7 | A-3 | 10 | M-1 | 10 | 58.9 | Dispersion K | 8 | 2-pyrrolidone | 10 |
| Example 8 | A-3 | 10 | M-1 | 10 | 61.9 | Dispersion C | 8 | 2-pyrrolidone | 10 |
| Comp. Example 1 | (*) P-1 | 10 | A-400 | 7 | 71.9 | Dispersion K | 8 | — | — |
| Comp. Example 2 | (*) P-1 | 10 | A-400 | 2 | 74.9 | Dispersion Y | 10 | — | — |
| Comp. Example 3 | — | — | A-400 | 17 | 71.9 | Dispersion K | 8 | — | — |
| Comp. Example 4 | (*) P-2 | 10 | A-400 | 7 | 64.7 | Dispersion Y | 10 | 2-pyrrolidone | 5 |

| | Sensitizer | | Surfactant | | Polymerization Initiator | | Ink Evaluation | | |
|---|---|---|---|---|---|---|---|---|---|
| | Abbrev. | Amt. Used (g) | Name | Amt. Used (g) | Name | Amt. Used (g) | Fixability | Solvent Resistance | Ejection Recovery Property |
| Example 1 | — | — | Glide 100 | 0.1 | Irgacure 2959 | 3 | B | B | A |
| Example 2 | S-1 | 0.2 | Glide 100 | 0.1 | Irgacure 2959 | 3 | A | A | A |
| Example 3 | — | — | Glide 100 | 0.1 | Irgacure 2959 | 3 | A | A | B |
| Example 4 | — | — | Glide 100 | 0.1 | Irgacure 2959 | 3 | A | A | A |
| Example 5 | — | — | Glide 100 | 0.1 | Irgacure 2959 | 3 | B | B | A |
| Example 6 | — | — | Glide 100 | 0.1 | Irgacure 2959 | 3 | B | B | A |
| Example 7 | — | — | Glide 100 | 0.1 | Irgacure 2959 | 3 | A | A | A |
| Example 8 | — | — | Glide 100 | 0.1 | — | — | A | A | B |

TABLE 1-continued

| Comp. Example 1 | — | — | Glide 100 | 0.1 | Irgacure 2959 | 3 | C | C | A |
| Comp. Example 2 | — | — | Glide 100 | 0.1 | Irgacure 2959 | 3 | C | C | C |
| Comp. Example 3 | — | — | Glide 100 | 0.1 | Irgacure 2959 | 3 | C | B | A |
| Comp. Example 4 | S-1 | 0.2 | Glide 100 | 0.1 | Irgacure 2959 | 3 | C | B | A |

The "—" means that the substance is not included.
Abbrev.: Abbreviated Name
Amt. used: Amount used
Comp. Example: Comparative Example As shown in Table 1, with the ink compositions of Examples of the invention, excellent effects were obtained in all of fixability, solvent resistance, and ejection recovery property.

In JP-A No. 2007-119449 in which an ink composition that contains an active energy ray polymerizable substance having a specific maleimide structure is disclosed, there is still room for improvement in fixability and solvent resistance. Further, there is still room for improvement in ejection recovery property of the ink composition. Therefore, there is a strong need for an ink composition having excellent fixability, solvent resistance, and ejection recovery property.

In view of the above circumstance, an object of the present invention is provision of an ink composition excellent in solvent resistance (durability against a solvent of the recorded image) and excellent in fixability (non-tackiness of a recorded image). Another object of the invention is improvement of re-ejectability after ejection is paused (hereinafter, referred to as ejection recovery property) by preventing solidification of an inkjet ink containing a polymer compound in the vicinity of a nozzle.

According to the present invention, an ink composition can be provided which has excellent ejection recovery property when an image is recorded by an inkjet method, and with which a recorded image having excellent solvent resistance and excellent fixability can be formed.

What is claimed is:

1. An ink composition comprising:
   (a) a polymer comprising a repeating unit (a1) having a group represented by the following Formula (1') and a repeating unit (a2) having a hydrophilic group; represented by the following Formula (2);
   (b) a radical polymerizable compound;
   (c) water; and
   (d) a colorant;

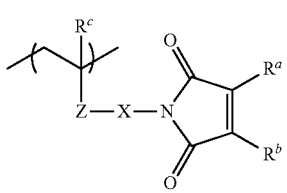

(1')

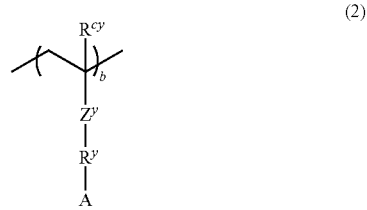

(2)

wherein, in Formula(1'), each of $R^a$ and $R^b$ independently represents an alkyl group having from 1 to 4 carbon atoms; $R^a$ and $R^b$ may be bound to each other to form a 4- to 6-membered alicyclic structure; $R^c$ represents a hydrogen atom or a methyl group; Z represents a single bond, —COO—*, or —CONR$^d$—*; $R^d$ represents a hydrogen atom or an alkyl group having from 1 to 4 carbon atoms; * represents a site bonding to X; and X represents a divalent organic group, and wherein, in Formula (2), $R^{cy}$ represents a hydrogen atom or a methyl group; $Z^y$ represents —COO—*, —CONR$^{dy}$—*, or a single bond; $R^{dy}$ represents a hydrogen atom or an alkyl group having from 1 to 4 carbon atoms; $R^y$ represents a group selected from the group consisting of a single bond, an alkylene group, an arylene group, and an aralkylene group; A represents a hydrophilic group; and * represents a site bonding to R.

2. The ink composition according to claim 1, wherein the (b) radical polymerizable compound is a compound having a (meth)acryloyloxy group or a (meth)acrylamide group.

3. The ink composition according to claim 1, wherein a content of the (a) polymer is from 0.5% by mass to 20% by mass, and a content of the (b) radical polymerizable compound is from 1% by mass to 20% by mass, with respect to the ink composition.

4. The ink composition according to claim 1, wherein the divalent organic group represented by X is an alkylene group having from 2 to 20 carbon atoms, the alkylene group optionally comprising at least one selected from the group consisting of an ether bond, an ester bond, an amide bond, a urethane bond, and an arylene group.

5. The ink composition according to claim 1, wherein the hydrophilic group in the repeating unit (a2) is at least one group selected from the group consisting of an amide group, a carbamoyl group, an alkyl-substituted carbamoyl group, an alcoholic hydroxyl group, a group having a polyalkyleneoxy structure, and a residue obtained by removing one hydrogen atom from a heterocyclic compound that includes a nitrogen atom or an oxygen atom.

6. The ink composition according to claim 1, wherein the hydrophilic group in the repeating unit (a2) is at least one group selected from the group consisting of a carboxyl group, a sulfo group, a phosphoric acid group, a phosphonic acid group, a phenolic hydroxyl group and salts thereof, and a quaternary ammonium salt.

7. The ink composition according to claim 1, wherein a content of the (c) water is from 10% by mass to 97% by mass with respect to the ink composition.

8. The ink composition according to claim 1, further comprising (e) a water-soluble organic solvent.

9. The ink composition according to claim 8, wherein the (e) water-soluble organic solvent is a compound represented by the following Formula (E1);

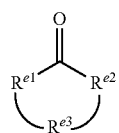
(E1)

wherein, in Formula (E1), each of $R^{e1}$ and $R^{e2}$ independently represents —CH$_2$—, NR$^{e4}$—, or —O—; $R^{e1}$ and $R^{e2}$ do not simultaneously represent —CH$_2$—; $R^{e4}$ represents an alkyl group having from 1 to 3 carbon atoms, a hydroxyalkyl group having from 1 to 3 carbon atoms, a hydroxyl group, or a hydrogen atom; $R^{e3}$ represents a hydrocarbon group represented by —C$_m$H$_{2m}$—, —C$_m$H$_{2m-2}$—, or C$_m$H$_{2m-4}$—; and m represents an integer of from 2 to 8.

10. The ink composition according to claim 9, wherein the (e) water-soluble organic solvent is 2-pyrrolidone or γ-butyrolactone.

11. An inkjet recording ink comprising the ink composition according to claim 1.

12. An image forming method comprising:
applying the ink composition according to claim 1 onto a recording medium; and
irradiating the ink composition with active energy rays.

13. The ink composition according to claim 1, wherein (d) the colorant is a pigment.

14. The ink composition according to claim 1, wherein the copolymerization ratio of the repeating unit represented by Formula (1') to the repeating unit represented by Formula (2) is 30:70 to 90:10 by mass.

* * * * *